US012754305B2

(12) United States Patent
Miyaoka et al.

(10) Patent No.: US 12,754,305 B2
(45) Date of Patent: Oct. 6, 2026

(54) RADAR DEVICE AND DATA OUTPUT METHOD FOR RADAR DEVICE

(71) Applicant: Sony Semiconductor Solutions Corporation, Kanagawa (JP)

(72) Inventors: Hirosada Miyaoka, Kanagawa (JP); Ryosuke Yamada, Tokyo (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 323 days.

(21) Appl. No.: 18/554,187

(22) PCT Filed: Sep. 27, 2022

(86) PCT No.: PCT/JP2022/035948
§ 371 (c)(1),
(2) Date: Oct. 5, 2023

(87) PCT Pub. No.: WO2023/054361
PCT Pub. Date: Apr. 6, 2023

(65) Prior Publication Data

US 2024/0192348 A1 Jun. 13, 2024

(30) Foreign Application Priority Data

Sep. 29, 2021 (JP) ................................ 2021-159435

(51) Int. Cl.
*G01S 13/34* (2006.01)
*G01S 13/42* (2006.01)
*G01S 13/86* (2006.01)

(52) U.S. Cl.
CPC ............ *G01S 13/34* (2013.01); *G01S 13/426* (2013.01); *G01S 13/86* (2013.01)

(58) Field of Classification Search
None
See application file for complete search history.

(56) References Cited

U.S. PATENT DOCUMENTS 3,651,486 A * 3/1972 Abrahamsson .......... H03K 3/00 713/502
2012/0258634 A1* 10/2012 Morana ................ H01R 13/187 29/830

(Continued)

FOREIGN PATENT DOCUMENTS

JP 2021042989 A 3/2021
WO 2021033479 A1 2/2021

OTHER PUBLICATIONS

Entry for "Raw Data" in Wikipedia; no author given; retrieved on Oct. 20, 2025. (Year: 2025).*

(Continued)

*Primary Examiner* — Bernarr E Gregory
(74) *Attorney, Agent, or Firm* — Michael Best & Friedrich LLP

(57) ABSTRACT

A radar device that facilitates external processing device data usage is disclosed. In one example, raw data immediately after a reception signal from a reception antenna is sampled at a predetermined period and subjected to A/D conversion and is output in a first output data format. Point cloud data generated by executing a predetermined signal process on the raw data is output in a second output data format, and data of an object recognition result obtained by executing an object recognition process on the point cloud data is output in a third output data format. In one example, the raw data is output in the first output data format and/or the point cloud data is output in the second output data format.

20 Claims, 16 Drawing Sheets

(56) References Cited

U.S. PATENT DOCUMENTS

| | | | | |
|---|---|---|---|---|
| 2015/0130652 | A1* | 5/2015 | Sugino | G01S 7/417 342/27 |
| 2017/0371492 | A1* | 12/2017 | Chen | G06F 3/041661 |
| 2018/0326977 | A1* | 11/2018 | Klarner | B60W 60/0016 |
| 2018/0348343 | A1* | 12/2018 | Achour | H01Q 1/364 |
| 2018/0372840 | A1 | 12/2018 | Rao | |
| 2019/0178985 | A1 | 6/2019 | Roh | |
| 2019/0285725 | A1 | 9/2019 | Roger | |
| 2019/0391249 | A1 | 12/2019 | Takeuchi | |
| 2020/0117913 | A1* | 4/2020 | Yamashina | G01S 13/726 |
| 2020/0400810 | A1 | 12/2020 | Cho | |
| 2021/0239806 | A1* | 8/2021 | Subasingha | G01S 7/4865 |
| 2021/0255278 | A1 | 8/2021 | Roger | |
| 2021/0255279 | A1 | 8/2021 | Piyali | |
| 2022/0252714 | A1* | 8/2022 | Kitamura | G01S 7/354 |
| 2022/0332331 | A1* | 10/2022 | Ming | B60W 50/023 |

OTHER PUBLICATIONS

International Search Report (PCT/ISA/210), International Application No. PCT/JP2022/035948, dated Nov. 8, 2022.

* cited by examiner

FIG. 14

| | point cloud | object |
|---|---|---|
| Position | RangeAzimuth - thetaElevation - phi | X, Y, Z |
| Size | NA | Wx, Wy, Wz |
| Direction | | Dx, Dy,Dz |
| Velocity | Vx, Vy, Vz | Vx,Vy,Vz |
| Acceleration | Ax, Ay, Az | Ax, Ay, Az |
| Power | xxx dB | xxx dB |
| ID | NA | yes |
| Category | NA | Car, Pedestrian, Bus, … |

FIG. 20

| | Range bin | Velocity bin | Angle bin | Power | Acceleration |
| --- | --- | --- | --- | --- | --- |
| Detection 1 | 10 | 13 | 5 | −40.2 dB | 0.12 m/s |
| Detection 2 | 10 | 13 | 6 | −41.3 dB | 0.12 m/s |
| Detection 3 | 10 | 13 | 7 | −43.1 dB | 0.12 m/s |
| Detection 4 | 11 | 13 | 5 | −43.4 dB | 0.12 m/s |
| ⋮ | ... | ... | ... | ... | ... |
| Detection X | ... | ... | ... | ... | ... |

RADAR DEVICE AND DATA OUTPUT METHOD FOR RADAR DEVICE

TECHNICAL FIELD

The present technology relates to a radar device and a data output method for the radar device, and more particularly to a radar device and a data output method for the radar device that facilitate use of data in an external processing device.

BACKGROUND ART

Patent Document 1 discloses that raw data including phase information and amplitude information can be stored in a storage of a radar device.

CITATION LIST

Patent Document

Patent Document 1: Japanese Patent Application Laid-Open No. 2021-42989

SUMMARY OF THE INVENTION

Problems to be Solved by the Invention

In the conventional radar device, use of data detected by the radar device in an external processing device is not considered, and it is not easy for the external processing device to use data of the radar device in fusion with another measurement device or the like.

The present technology has been made in view of such a situation, and makes it easy to use data in an external processing device.

Solutions to Problems

A radar device according to the present technology includes of a first interface that outputs raw data immediately after a reception signal from a reception antenna is sampled for predetermined periods and subjected to A/D conversion in a first output data format, a second interface that outputs point cloud data generated by executing a predetermined signal process on the raw data in a second output data format, and a third interface that outputs data of an object recognition result obtained by executing an object recognition process on the point cloud data in a third output data format, at least the first interface or the second interface.

In a data output method for a radar device according to the present technology, the radar device including, of a first interface, a second interface, and a third interface, at least the first interface or the second interface, the method includes the first interface outputting raw data immediately after a reception signal from a reception antenna is sampled for predetermined periods and subjected to A/D conversion in a first output data format, the second interface outputting point cloud data generated by executing a predetermined signal process on the raw data in a second output data format, and the third interface outputting data of an object recognition result obtained by executing an object recognition process on the point cloud data in a third output data format.

In a radar device and a data output method for the radar device according to the present technology, raw data immediately after a reception signal from a reception antenna is sampled at a predetermined period and subjected to A/D conversion is output in a first output data format, point cloud data generated by executing a predetermined signal process on the raw data is output in a second output data format, and data of an object recognition result obtained by executing an object recognition process on the point cloud data is output in a third output data format. However, at least one of a case where the raw data is output in the first output data format and a case where the point cloud data is output in the second output data format may be performed.

BRIEF DESCRIPTION OF DRAWINGS

FIG. 14 is a diagram illustrating output data formats of second type detection data and third type detection data output from the second and third embodiments of the radar device to which the present technology is applied.

FIG. 20 is a diagram illustrating an example of data of a data region of "Data" in the second mode format.

MODE FOR CARRYING OUT THE INVENTION

Hereinafter, embodiments of the present technology will be described with reference to the drawings.

<Basic Configuration of Radar Device>

Figure 1:
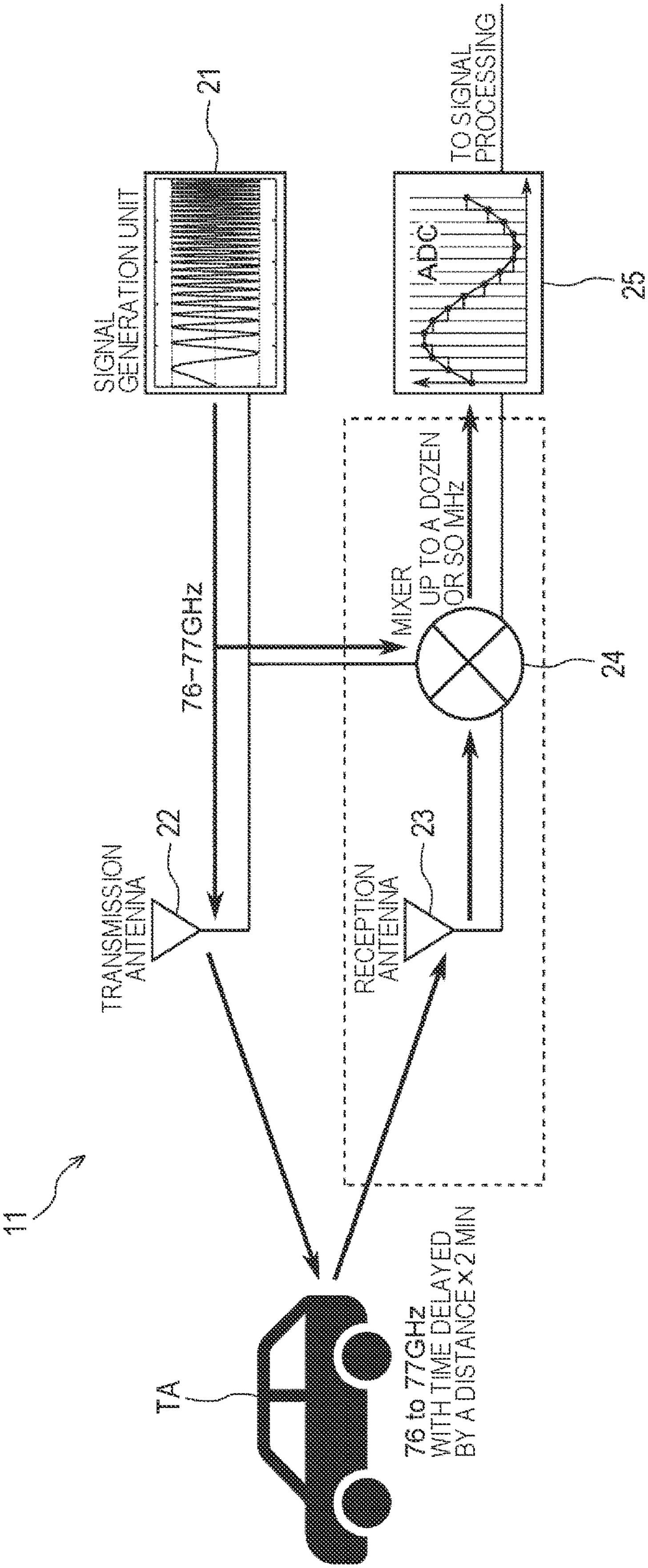
FIG. 1 is a diagram illustrating a basic configuration of a radar device to which the present technology is applied.

FIG. 1 is a diagram illustrating a basic configuration of a radar device to which the present technology is applied.

A radar device 11 of FIG. 1 is a device that emits radio waves and captures reflected waves thereof to detect a distance, a direction (angle), and the like of an object (target) existing in space with respect to the radar device 11. The radar device 11 is, for example, a frequency modulated continuous wave (FMCW) radar device using millimeter waves (30 GHz to 300 GHz in terms of frequency) as radio waves. However, the present technology can also be applied to a radar device other than the FMCW system.

The radar device 11 includes a signal generation unit 21, a transmission antenna 22, a reception antenna 23, a mixer (mixing unit) 24, and an analog to digital converter (ADC) 25.

The signal generation unit 21 generates a chirp signal obtained by frequency-modulating the sine wave signal, and supplies the chirp signal to the transmission antenna 22 and the mixing unit 24. The chirp signal is, for example, a signal whose frequency is continuously (linearly) changed (swept) from a predetermined minimum frequency to a predetermined maximum frequency in predetermined periods. For example, in the present embodiment, the frequency of the chirp signal is changed between 76 GHZ and 77 GHZ.

The transmission antenna 22 radiates (transmits) the chirp signal from the signal generation unit 21 into the air as a radio wave (transmission wave).

The reception antenna 23 receives a radio wave (is also referred to as a reception wave or a reflected wave) that is transmitted from the transmission antenna 22 and then reflected by the object TA and arrives. The reception wave received by the reception antenna 23 is supplied to the mixing unit 24 as a reception signal.

The reception antenna 23 includes, for example, a plurality of linearly disposed reception antennas (array antennas), and the plurality of reception antennas is illustrated as one reception antenna 23 in FIG. 1. In a case where a plurality of reception antennas is explicitly indicated, the reception antennas are represented as reception antennas 23-1 to 23-N (N is the number of reception antennas). Note that the reception antenna 23 is not limited to a linearly disposed array antenna, and may be an array antenna disposed in a planar shape (two-dimensional shape) or the like.

The mixing unit 24 generates an intermediate frequency signal (IF signal) by mixing the chirp signal from the signal generation unit 21 and the reception signal from the reception antenna 23. The IF signal is a beat signal having a difference frequency (beat frequency) that is a difference between the frequency of the reception signal and the frequency of the chirp signal. The IF signal generated by the mixing unit 24 is supplied to the ADC 25. Note that the mixing unit 24 may be regarded as a component of the reception antenna 23 for generating the reception signal (IF signal) obtained by the reception antenna 23, and the reception antenna 23 may include the mixing unit 24.

The ADC 25 samples the value of the IF signal from the mixing unit 24 at a predetermined sampling period, and converts the sampled value from an analog value to a digital value (A/D conversion). As a result, the IF signal is converted from an analog signal to a digital signal (AD conversion). The IF signal (also referred to as raw data) A/D converted into the digital signal is supplied to the signal processing unit in the subsequent stage.

Note that IF signals (raw data) for N channels corresponding to the plurality of reception antennas 23-1 to 24-N in the reception antenna 23 is supplied from the ADC 25 to the signal processing unit. The radar device 11 includes the mixing unit 24 and the ADCs 25 for N channels corresponding to the reception antennas 23-1 to 24-N. However, any one or more of the mixing unit 24 and the ADC 25 may perform processing for a plurality of channels by the time division process. The signal processing unit at the subsequent stage of the ADC 25 may be an external processing device separate from the radar device 11.

The signal processing unit that has acquired the IF signal from the ADC 25 calculates, for example, a distance spectrum, a velocity spectrum, and an angle spectrum on the basis of the acquired IF signal. The distance spectrum is information for identifying a distance (referred to as a distance of an object) from the radar device 11 (reception antenna 23) to a position where the object is present in a scanning range (measurement range) of the radar device 11 which is the entire space range in which the object can be detected by the radar device 11. The velocity spectrum is information for identifying a relative moving velocity (referred to as a velocity of the object) of the object moving relative to the radar device 11. The angle spectrum is information for identifying a direction (referred to as an angle of the object) of a position where an object is present with respect to the radar device 11 in the scanning range of the radar device 11. Note that, in the present specification, the term "object" may be used in the sense of indicating the entire object as an integral object to which a name is attached, or may be used in the sense of indicating a portion of an any object existing in a space regardless of whether or not the object is such an integral object. It is mainly used in the latter meaning, and in a case where there is a doubt in the case of using the term in the former meaning, it is an object or the like as an integrated object.

Each of the distance spectrum, the velocity spectrum, and the angle spectrum is calculated by the fast Fourier transform (FFT) process on the IF signal. The FFT for calculating the distance spectrum is referred to as a distance FFT, the FFT for calculating the velocity spectrum is referred to as a velocity FFT, and the FFT for calculating the angle spectrum is referred to as an angle FFT. At this time, the distance FFT, the velocity FFT, and the angle FFT are specifically the following processes.

Figure 2:
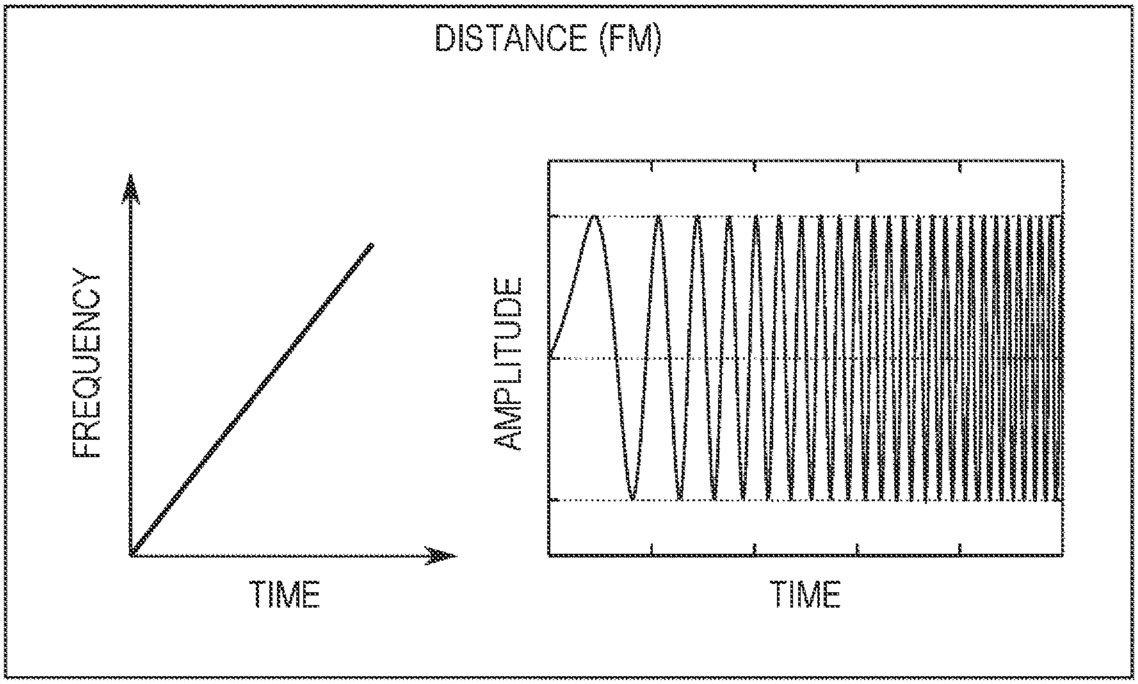
FIG. 2 is a diagram schematically illustrating detection of a distance of an object.

The distance FFT is a fast Fourier transform (FFT) that performs frequency conversion from time domain representation (representation with a function using time t as a variable) to frequency domain representation (representation with a function using frequency as a variable) on the IF signal from the ADC 25. The distance FFT is performed, for example, on the IF signal of a channel corresponding to each of the reception antennas 23-1 to 23-N. As a result, a spectrum signal (distance spectrum) representing a frequency component included in the IF signal of each channel is calculated. The distance spectrum shows high intensity at a frequency corresponding to the distance of an object present in the scanning range of the radar device 11. Therefore, the distance of the object present in the scanning range of the radar device 11 is detected on the basis of the distance spectrum. Here, the detection of the distance of the object will be schematically described as follows. As illustrated in FIG. 2, for example, a radio wave having a waveform whose frequency changes with time is emitted to an object. At this time, the distance of the object based on the propagation time of the radio wave from the time (radio wave transmission time) when the radio wave is transmitted from the transmission antenna 22 to the time (radio wave reception time) when the radio wave reflected by the object is received by the reception antenna 23 is detected using the waveform that changes with time. The distance of the object is repeatedly detected for each chirp signal having the same waveform and repeatedly transmitted.

Figure 3:
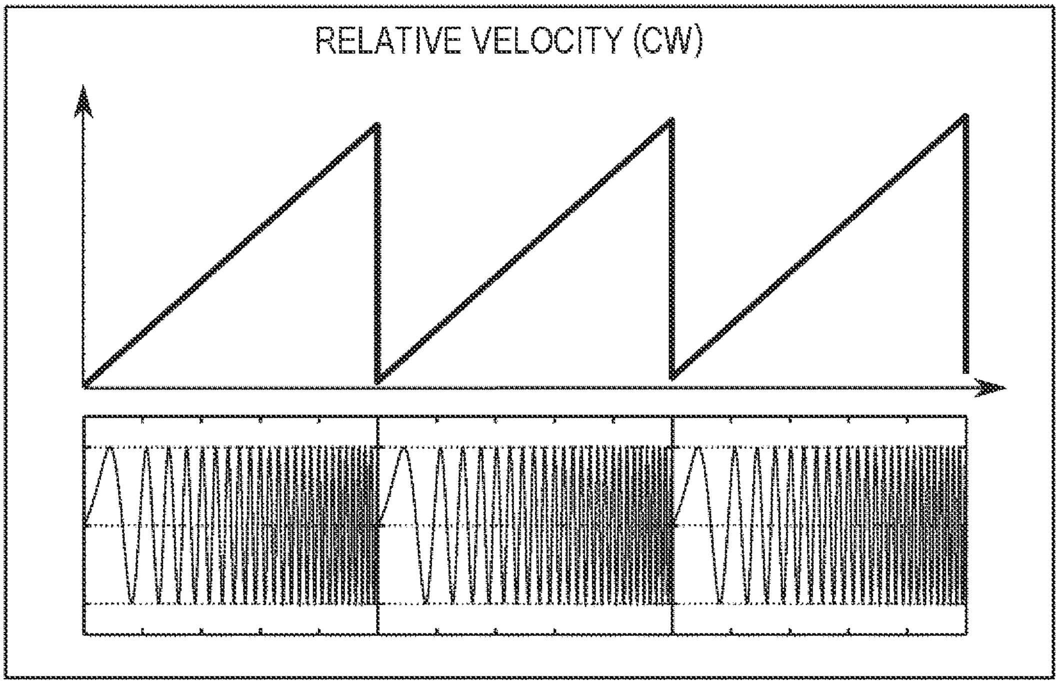
FIG. 3 is a diagram schematically illustrating detection of a velocity of an object.

The velocity FFT is an FFT that performs frequency conversion from time domain representation to frequency domain representation on component signals in which data for the same distance (same frequency) is disposed in chronological order in data of a distance spectrum obtained by the distance FFT. The velocity FFT is performed, for example, on the IF signal of a channels corresponding to each of the reception antennas 23-1 to 23-N, with the IF signals corresponding to the chirp signal for predetermined periods (M periods) as one set of IF signals, for each one set of IF signal. The IF signals corresponding to the chirp signal for M periods represents IF signals obtained by transmission of the chirp signal for M periods from the transmission antenna 22 among the IF signals obtained by the reception antenna 23 and the mixing unit 24, and is also referred to as IF signals for M chirp frames. The one set of IF signals is IF signals for M chirp frames. Since the distance FFT is performed for each IF signal for one chirp frame, in a case where the distance FFT is performed on one set of IF signals, data of the distance spectra for the M chirp frames is obtained as data of one set of distance spectra. In the velocity FFT, frequency conversion by FFT is performed on component signals (referred to as temporal component signals of the distance spectrum) in which M pieces of data for the same distance (same frequency) are disposed in chronological order in the data of one set of distance spectra. As a result, a spectrum signal (velocity spectrum) representing a frequency component included in the temporal component signals of the distance spectrum of each channel is calculated. The velocity spectrum exhibits a high intensity at a frequency corresponding to the relative velocity with respect to the object. Therefore, the relative velocity with respect to the object is detected on the basis of the velocity spectrum. Here, the detection of the relative velocity with respect to the object will be schematically described as follows. As illustrated in FIG. 3, as in FIG. 2, the object is repeatedly irradiated with a radio wave having a waveform whose frequency changes with time. At this time, the radio wave reflected by the object is repeatedly received by the reception antenna 23, and the relative velocity with respect to the object is detected on the basis of the waveform of the repeatedly received radio wave.

Figure 4:
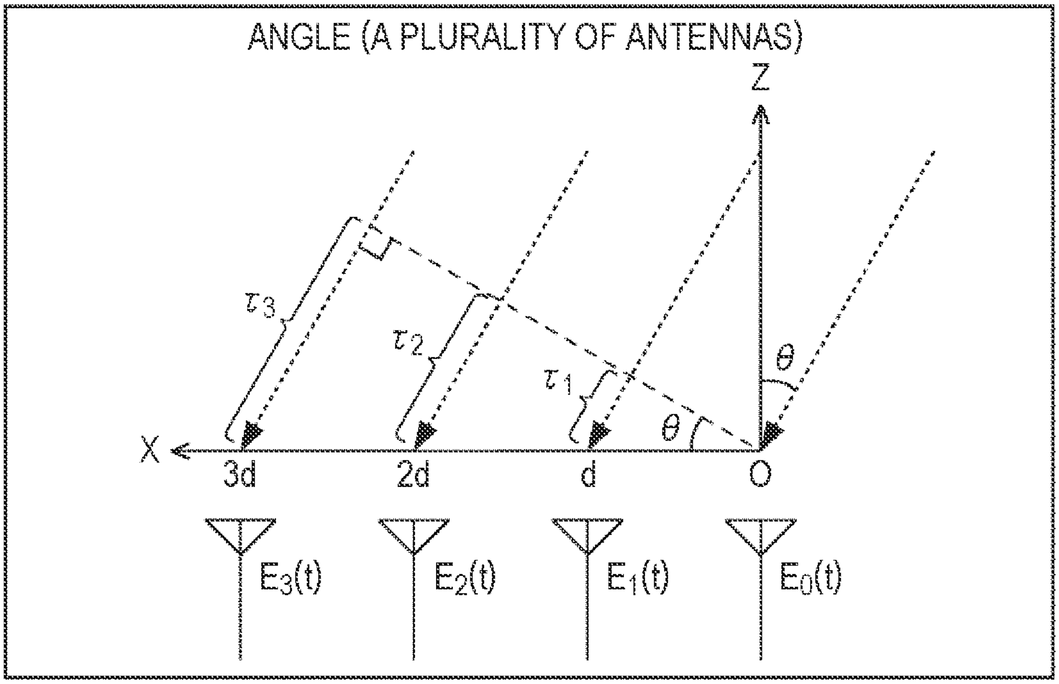
FIG. 4 is a diagram schematically illustrating detection of an angle of an object.

The angle FFT is FFT using the data of the distance spectrum of each channel obtained by the distance FFT on the IF signal of a channel corresponding to each of the plurality of reception antennas 23-1 to 23-N. Specifically, in the angle FFT, in the data of the distance spectrum of each channel, frequency conversion from spatial domain representation to frequency domain representation by FFT is performed on component signals (referred to as spatial component signals of the distance spectrum) in which N pieces of data for the same distance (same frequency) are spatially disposed as values at the positions of the corresponding reception antennas 23-1 to 23-N. As a result, a spectrum signal (angle spectrum) representing a frequency component included in the spatial component signals of the distance spectrum is calculated. The angle spectrum exhibits a high intensity at a frequency corresponding to the angle of the object. Therefore, the angle of the object is detected on the basis of the angle spectrum. Here, the detection of the angle of the object will be schematically described as follows. As illustrated in FIG. 4, an object is irradiated with a radio wave having a waveform whose frequency changes with time as in FIG. 2. At this time, the radio waves reflected by the object are received by the reception antennas 23-1 to 23-N, and the angle of the object is detected on the basis of the waveforms of the received radio waves.

The velocity FFT and the angle FFT may be performed only on the temporal component signal or the spatial component signal of the distance spectrum with respect to the distance at which the object is determined to exist by the distance spectrum.

Figure 5:
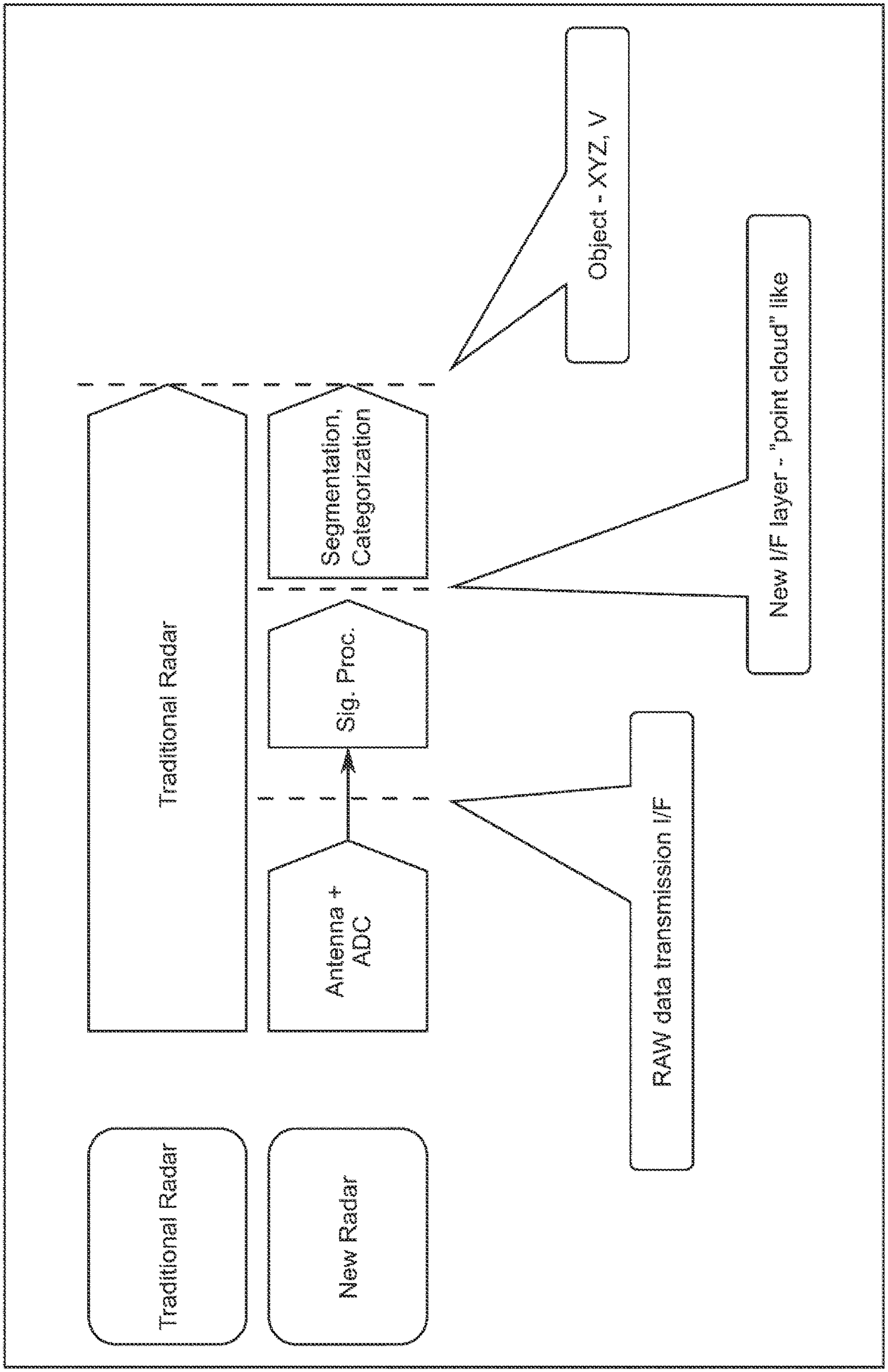
FIG. 5 is an explanatory diagram for explaining a form of detection data output to an external device by a radar device to which the present technology is applied.

FIG. 5 is an explanatory diagram for describing a form of detection data output to an external device (external processing device) by the radar device 11 to which the present technology is applied. In FIG. 5, "Traditional Radar" and "New Radar" respectively indicate a general radar device (conventional radar device) and the radar device 11 to which the present technology is applied. In a general radar device, data of a type, a position (position coordinates), and a velocity of each object as an integrated object is output to an external device as detection data. Here, in a case where a radar device mounted on an automobile is assumed, the object as an integral object means an object of a type such as an automobile (passenger car), a pedestrian, and a bus recognized by an object recognition technology.

As the radar device 11 to which the present technology is applied, first to third embodiments that output respective three types of detection data are conceivable. In the first embodiment of the radar device 11, raw data (data of the IF signal sampled and A/D converted) received by the reception antenna 23 to output from the ADC 25 of FIG. 1 is output to an external device as first type detection data (raw data).

In the second embodiment of the radar device 11, point cloud data (to be described later) obtained by the distance FFT, the velocity FFT, and the angle FFT on the basis of the raw data output from the ADC 25 is output as second type detection data (point cloud). In the third embodiment of the radar device 11, the velocity FFT, and the angle FFT, data of the type, the position, and the velocity of the object as the integrated object obtained by the object recognition on the basis of the point cloud data obtained by the distance FFT is output as the third type detection data. The third type detection data is similar to that of a general radar device.

Here, in a general radar device (conventional radar device), a result of object recognition (type, position, and velocity of the object) is output to an external device as detection data. Specifically, the reception antenna receives a radio wave, A/D conversion and FFT are executed to generate point cloud data, classification and the like of the point cloud data are performed to perform an object recognition process, and an object recognition result is output to an external device.

In recent years, sensor fusion that integrates different sensor data has attracted attention. Sensor fusion can be roughly divided into two fusion: late fusion and early fusion. The late fusion is, for example, fusion of an object recognition result obtained by executing using an image captured by a camera (imaging device) and an object recognition result obtained by executing using a radar device, and object recognition is performed with higher accuracy than object recognition by a single sensor. On the other hand, in the early fusion, data (raw data or the like) before the sensor performs the object recognition process by itself is fused, and the object recognition process is performed using the fused data. This method is suitable for the object recognition process using machine learning.

However, there is no radar device capable of outputting detection data that can be input to a recognizer (inference model) using machine learning, and an output data format thereof is not defined.

The present technology can facilitate use of detection data output from a radar device in an external device by defining an output data format of detection data output from the radar device.

First Embodiment of Radar Device 11

Figure 6:
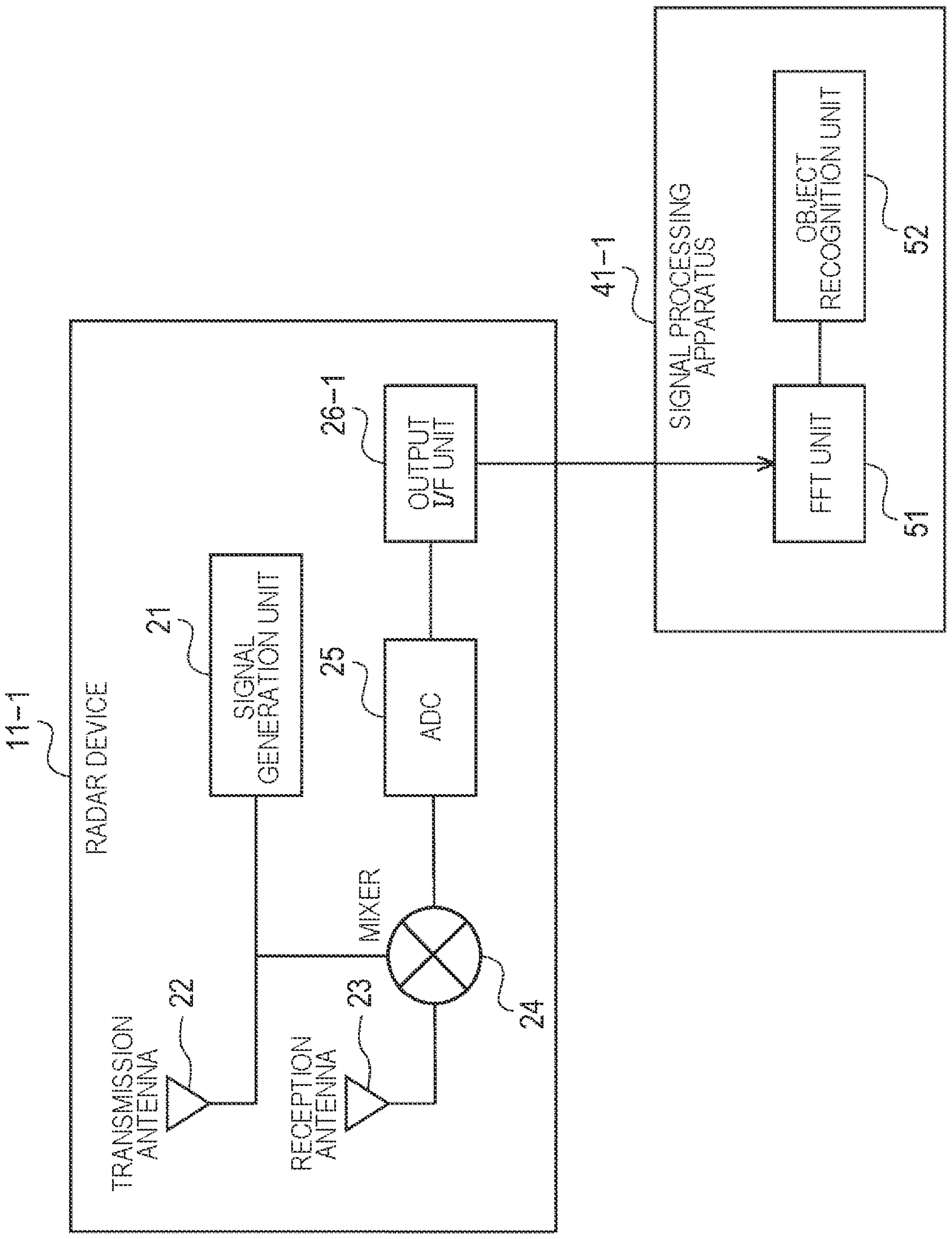
FIG. 6 is a block diagram illustrating a configuration example of a first embodiment of a radar device to which the present technology is applied.

FIG. 6 is a block diagram illustrating a configuration example of the first embodiment of the radar device 11 to which the present technology is applied. Note that, in the figure, units common to those of the radar device 11 in FIG. 1 are denoted by the same reference numerals, and a detailed description thereof will be omitted.

A radar device 11-1 according to the first embodiment of FIG. 6 includes the signal generation unit 21, the transmission antenna 22, the reception antenna 23, the mixing unit 24, the ADC 25, and an output I/F unit 26-1. The signal generation unit 21, the transmission antenna 22, the reception antenna 23, the mixing unit 24, and the ADC 25 of the radar device 11-1 are common to the signal generation unit 21, the transmission antenna 22, the reception antenna 23, the mixing unit 24, and the ADC 25 of the radar device 11 of FIG. 1. However, the radar device 11-1 is different from the radar device 11 of FIG. 1 in that the output I/F unit 26-1 is newly added.

The IF signal (raw data) obtained by sampling and performing A/D conversion on the IF signal for predetermined periods is supplied from the ADC 25 to the output I/F unit 26-1. The output I/F unit 26-1 forms the raw data from the ADC 25 into a data group adapted to a predetermined output data format to output the data group to a signal processing apparatus 41-1 which is an external device.

The signal processing apparatus 41-1 includes an FFT unit 51 and an object recognition unit 52. The FFT unit 51 performs the above-described distance FFT, velocity FFT, and angle FFT on the raw data (IF signal) supplied from the output I/F unit 26-1 of the radar device 11-1. As a result, the distance, the relative velocity, and the angle of the object present in the scanning range of the radar device 11-1 are detected. That is, the point cloud data including the data indicating the distance and the angle indicating the position (point) where the object is present in the scanning range and the data indicating the relative velocity with respect to the object at the position (point) where the object is present is detected. The point cloud data is also data of coordinate values indicating the position (point) where the object is present. The FFT unit 51 supplies the detected point cloud data to the object recognition unit 52.

The object recognition unit 52 performs the object recognition process (object classification process) on the basis of the point cloud data from the FFT unit 51, and recognizes (classifies) the type of the object as an integrated object. The type of the object that can be recognized varies depending on the use environment of the radar device 11-1 and the like. For example, in a case where the radar device 11-1 is mounted on an automobile, types of objects that can be recognized include types of objects that can exist around the automobile, such as an automobile, a pedestrian, a bus, a traffic light, and a road sign. The object recognition unit 52 supplies data of the type, position, and velocity of the recognized object to a processing unit (not illustrated) at a subsequent stage. The processing in the processing unit in the subsequent stage is not limited to specific processing.

Note that the data transmission between the radar device 11-1 and the signal processing apparatus 41-1 may be performed in a wired or wireless manner, or may be performed by communication conforming to a predetermined communication protocol such as IP.

Figure 7:
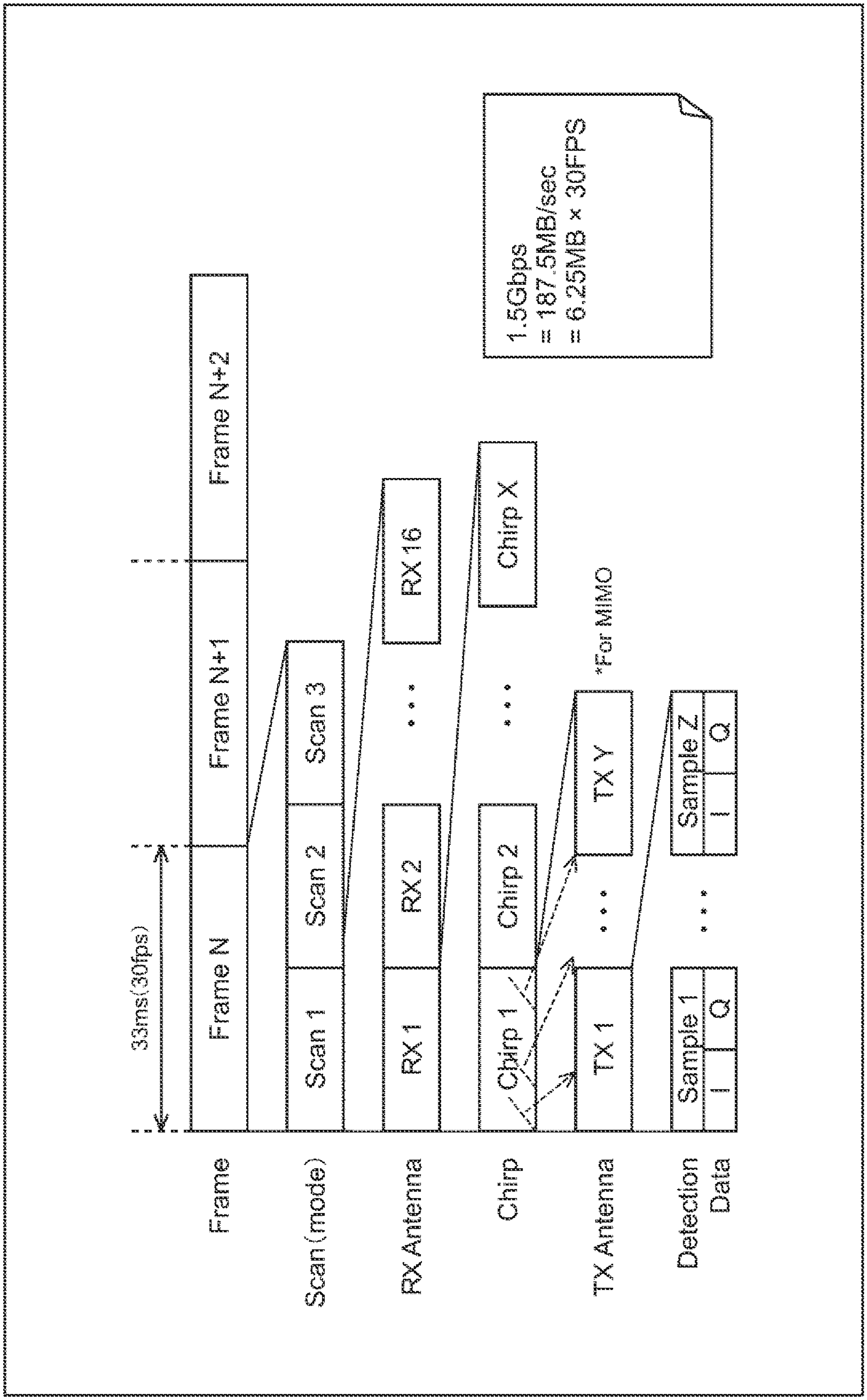
FIG. 7 is a diagram illustrating an output data format of detection data (first type detection data) output by an output I/F unit of the radar device according to the first embodiment.

FIG. 7 is a diagram illustrating an output data format of detection data (first type detection data) output by the output I/F unit 26-1 of the radar device 11-1.

In FIG. 7, the item “Frame” indicates that the detection data output from the output I/F unit 26-1 is divided into frames which are basic constituent units. Note that the data from the output I/F unit 26-1 is sequentially output from left to right in the drawing. In the item “Frame”, “Frame N”, “Frame N+1”, and “Frame N+2” indicate data regions of N-th, (N+1)-th, and (N+2)-th frames, respectively, where N is an any number. The output I/F unit 26-1 repeatedly outputs frames including data strings having the same structure.

The item “Scan (mode)” under the item “Frame” indicates that a data region divided for each frame is further divided into data regions of the scan mode. In the item “Scan (mode)”, “Scan1”, “Scan2”, and “Scan3” indicate data regions of scan modes 1, 2, and 3, respectively.

(Description of Scan Mode)

Here, the scan mode will be described. There is a plurality of types of scan modes, and in the present embodiment, there are three types of scan modes 1, 2, and 3. In respective scan modes, the transmission antennas 22 used in the radar device 11-1 are different, and the scanning ranges of the radar device 11-1 are different. A common antenna is used for the reception antenna 23 with respect to the transmission antenna 22 in any scan mode. Note that the number of the scan modes is not limited to three types.

Figure 8:
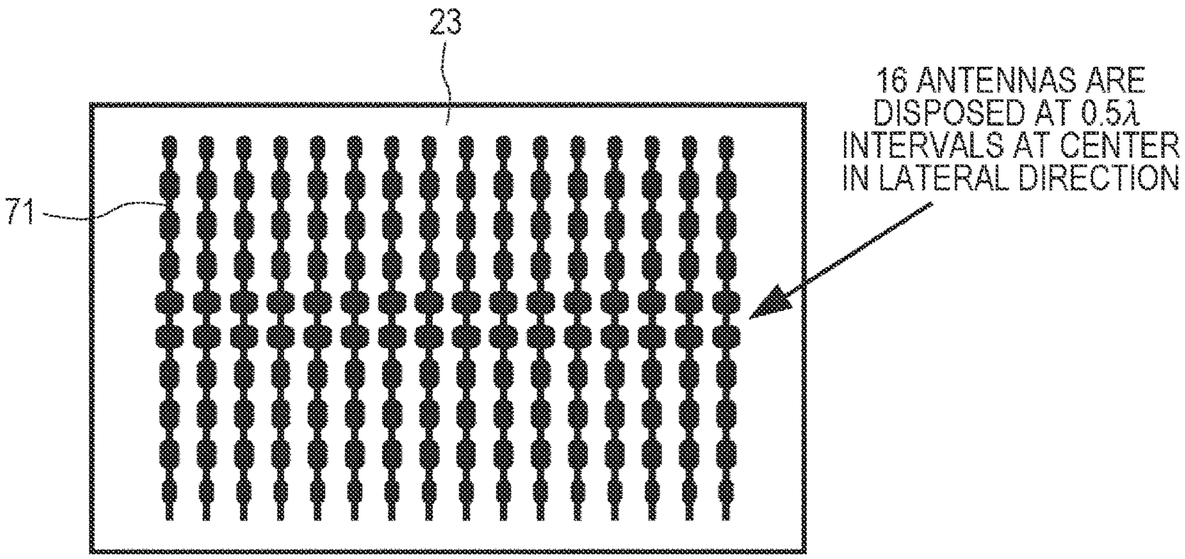
FIG. 8 is a diagram illustrating an arrangement of reception antennas.

FIG. 8 is a diagram illustrating an arrangement of the reception antenna 23. In FIG. 8, the reception antenna 23 includes, for example, 16 antennas 71 having the same shape extending in the vertical direction. The antennas 71 are aligned at equal intervals in the lateral direction and are disposed at positions where the center positions are aligned in the vertical direction. The interval between respective antennas 71 in the lateral direction is, for example, an interval (0.5λ) that is ½ of the wavelength λ of the radio wave (chirp signal) to be transmitted and received. In the above description, the reception antenna 23 includes the plurality of reception antennas 23-1 to 23-N, and the 16 antennas 71 in FIG. 8 correspond to the reception antennas 23-1 to 23-N (N is 16).

Figure 9:
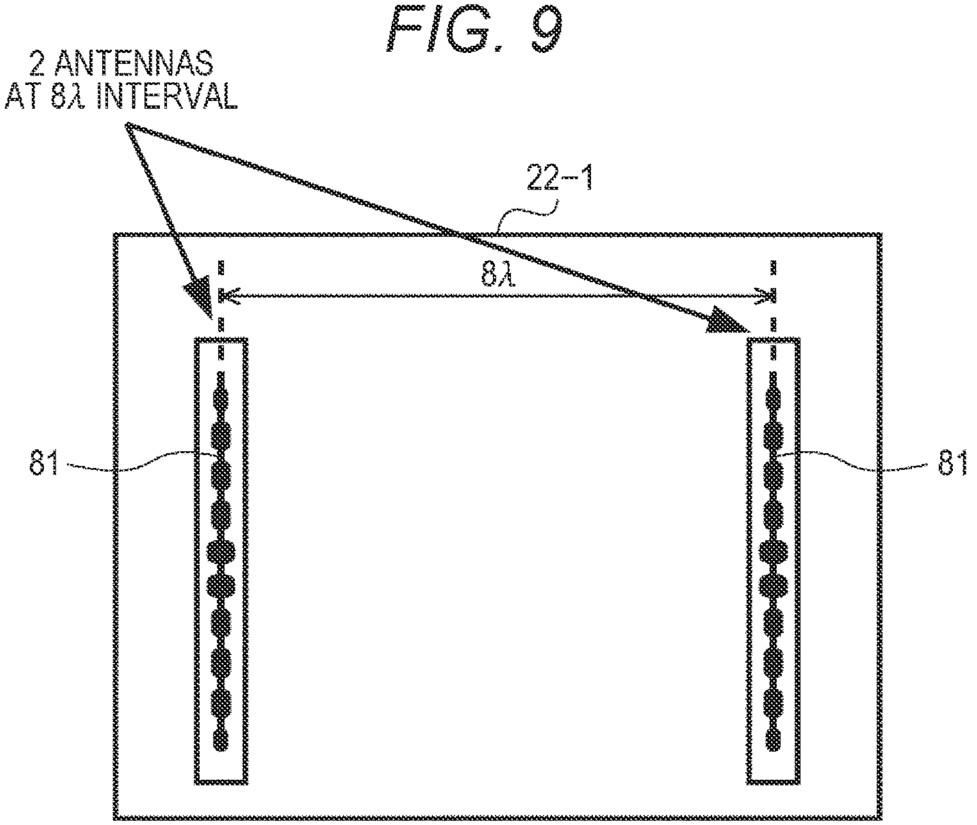
FIG. 9 is a diagram illustrating an arrangement of transmission antennas used in a scan mode 1.

In the scan mode 1, for example, a transmission antenna 22-1 of FIG. 9 is used as the transmission antenna 22. In FIG. 9, the transmission antenna 22-1 includes two antennas 81 having the same shape and extending in the vertical direction. The two antennas 81 are disposed at a predetermined distance in the lateral direction, and are disposed at positions where center positions are aligned in the vertical direction. The interval between the two antennas 81 in the lateral direction is, for example, an interval (8λ) that is eight times the wavelength A of the radio wave to be transmitted and received, and are disposed so as to sandwich the reception antenna 23-1 on both left and right sides of the reception antenna 23-1 in FIG. 8. In the scan mode 1, a radio wave is transmitted from the transmission antenna 22-1 of FIG. 9, so that a range of a short distance with respect to the radar device 11-1 is mainly set as a scanning range.

Figure 10:
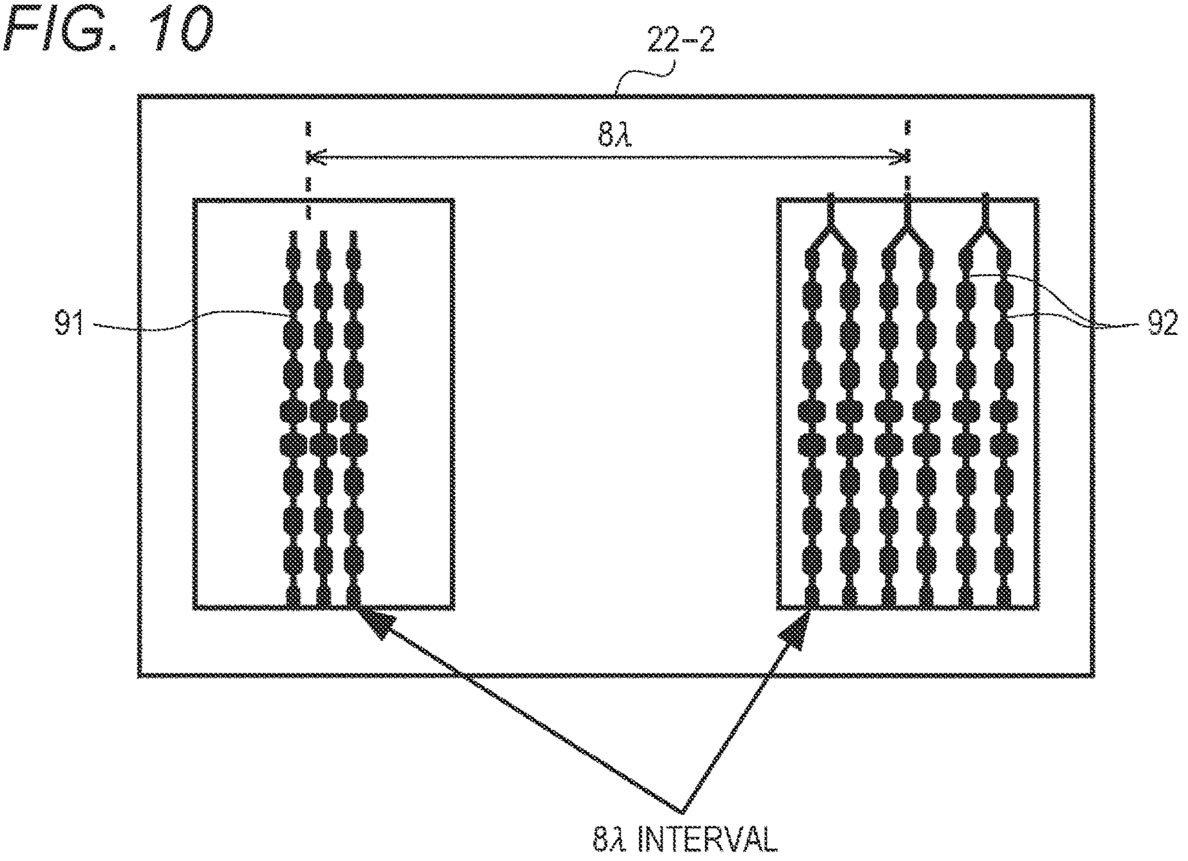
FIG. 10 is a diagram illustrating an arrangement of transmission antennas used in a scan mode 2.

In the scan mode 2, for example, a transmission antenna 22-2 of FIG. 10 is used as the transmission antenna 22. In FIG. 10, the transmission antenna 22-2 includes three antennas 91 extending in the vertical direction and having the same shape, and six antennas 92 extending in the vertical direction and having the same shape. The three antennas 91 on the left side are disposed at 0.5λ intervals in the lateral direction and are disposed at positions where the center positions are aligned in the vertical direction. The six antennas 92 on the right side are disposed at 0.5λ intervals in the lateral direction, and are disposed at positions where center positions are aligned in the vertical direction. The six antennas 92 are composed of one set of two bifurcated antennas 92. The three antennas 91 on the left side and the six antennas 92 on the right side (three sets) have an interval of 8λ in the lateral direction in the vicinity of the center thereof, and are disposed so as to sandwich the reception antenna 23-1 on both left and right sides of the reception antenna 23-1 in FIG. 8. In the scan mode 2, radio waves are transmitted from one or both of the three antennas 91 on the left side and the six antennas 92 on the right side of the transmission antenna 22-2 in FIG. 10, so that a range longer than that of the scan mode 1 with respect to the radar device 11-1 is mainly set as a scanning range.

Figure 11:
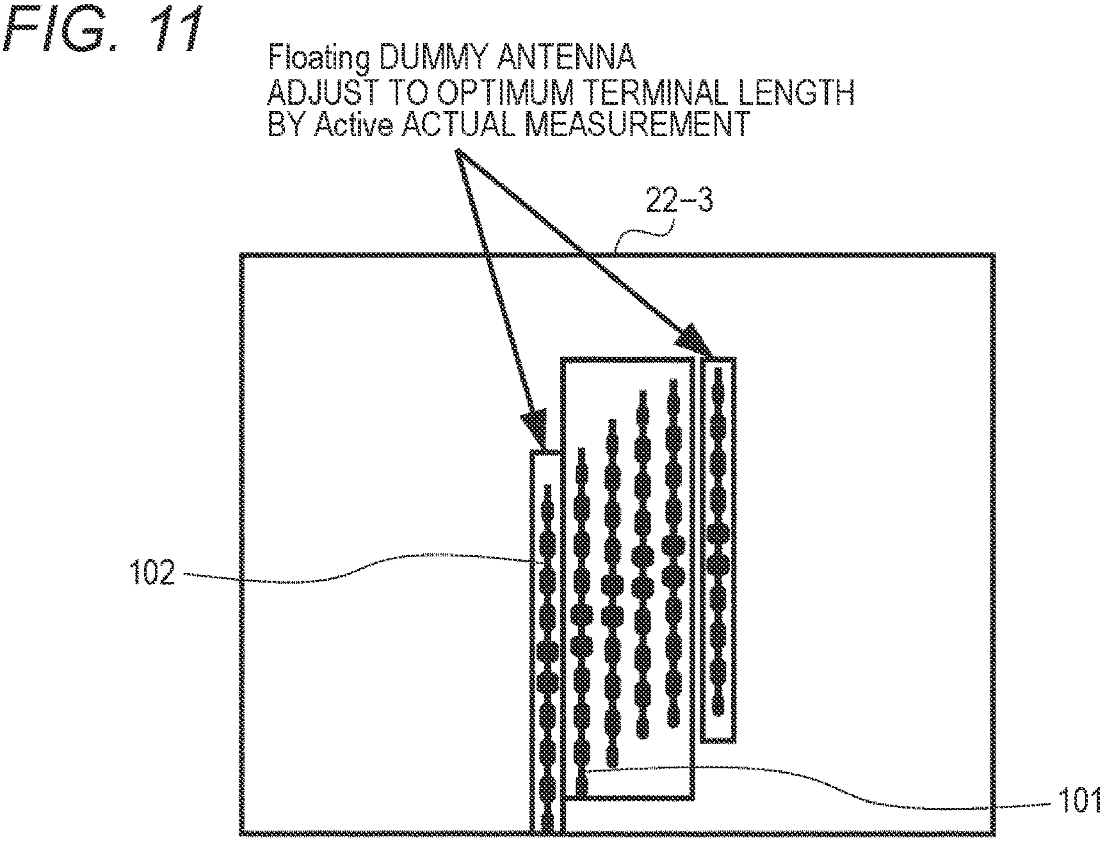
FIG. 11 is a diagram illustrating an arrangement of transmission antennas used in a scan mode 3.

In the scan mode 3, for example, a transmission antenna 22-3 of FIG. 11 is used as the transmission antenna 22. In FIG. 11, the transmission antenna 22-3 includes four antennas 101 and two dummy antennas 102 having the same shape extending in the vertical direction. The two dummy antennas 102 are disposed one by one on both left and right sides of the four antennas 101. No power is supplied to the dummy antenna 102, and the dummy antenna 102 has an effect of aligning the transmission states of the radio waves of the four antennas 101. The four antennas 101 and the two dummy antennas 102 on the left and right sides thereof are disposed at an interval of 0.5λ in the lateral direction, and are disposed at positions where the center position is shifted upward or downward by 0.5λ in the vertical direction. The transmission antenna 22-3 is disposed on the left side or the right side of the reception antenna 23-1 in FIG. 8. In the scan mode 3, by transmitting radio waves from the transmission antenna 22-3, the scanning range is mainly expanded in the vertical direction with respect to the radar device 11-1 as compared with other modes.

In FIG. 7, "Scan 1", "Scan 2", and "Scan 3" of the item "Scan (mode)" indicate that the scan modes are data regions of data acquired by being sequentially switched in the scan modes 1, 2, and 3.

The item "RX Antenna" under the item "Scan (mode)" indicates that the data region divided in the scan modes is further divided into data regions of the reception antenna. In the item "RX Antenna", "RX 1", "RX 2", . . . and "RX 16" indicate data regions of data obtained by the channels 1 to 16 corresponding to the reception antennas 23-1 to 23-16, respectively. The reception antennas 23-1 to 23-16 correspond to the 16 respective antennas 71 in FIG. 8. Note that the number of reception antennas is not limited to 16.

The item "Chirp" under the item "RX Antenna" indicates that the data region divided in the reception antenna is further divided into data regions of the chirp signal. In the item "Chirp", "Chirp 1", "Chirp 2", . . . , and "Chirp X" (X is a predetermined natural number) indicate data regions of data obtained for the chirp signals of the first to X-th periods, respectively. A data set corresponding to one chirp signal group includes data of chirp signals corresponding to a plurality of transmission antennas. For example, the data set of "Chirp 1" includes data of a chirp signal corresponding to "TX1" and data of a chirp signal corresponding to "TX Y" as described later.

The item "TX Antenna" under the item "Chirp" indicates that the data region divided in the chirp signals is further divided into data regions of the transmission antenna. In the item "TX Antenna", "TX 1", "TX 2", . . . , and "TX Y" indicate data regions of data obtained for the transmission antennas 22-1 to 22-Y (Y is a predetermined natural number) that have transmitted radio waves, respectively.

The item "Detection Data" under the item "TX Antenna" indicates that the data region divided in the transmission antennas is further divided into data regions of the sampling point (sampling time). In the item "Detection Data", "Sample 1", "Sample 2", . . . , and "Sample Z" (Z is a predetermined natural number) indicate data regions of data at sampling points 1 to Z where sampling and A/D conversion are performed on the IF signal by the ADC 25, respectively. The data at the sampling points 1 to Z is raw data obtained by sampling and A/D converting the IF signal by the ADC 25. The raw data includes, for example, 16 bit I data and Q data (so-called IQ data). That is, the value of the real part at each of the sampling points 1 to Z in the case of complex display of the IF signal is I data, and the value of the imaginary part is Q data.

The output I/F unit 26-1 outputs the detection data to the signal processing apparatus 41-1 in the output data format as illustrated in FIG. 7.

Figure 15:
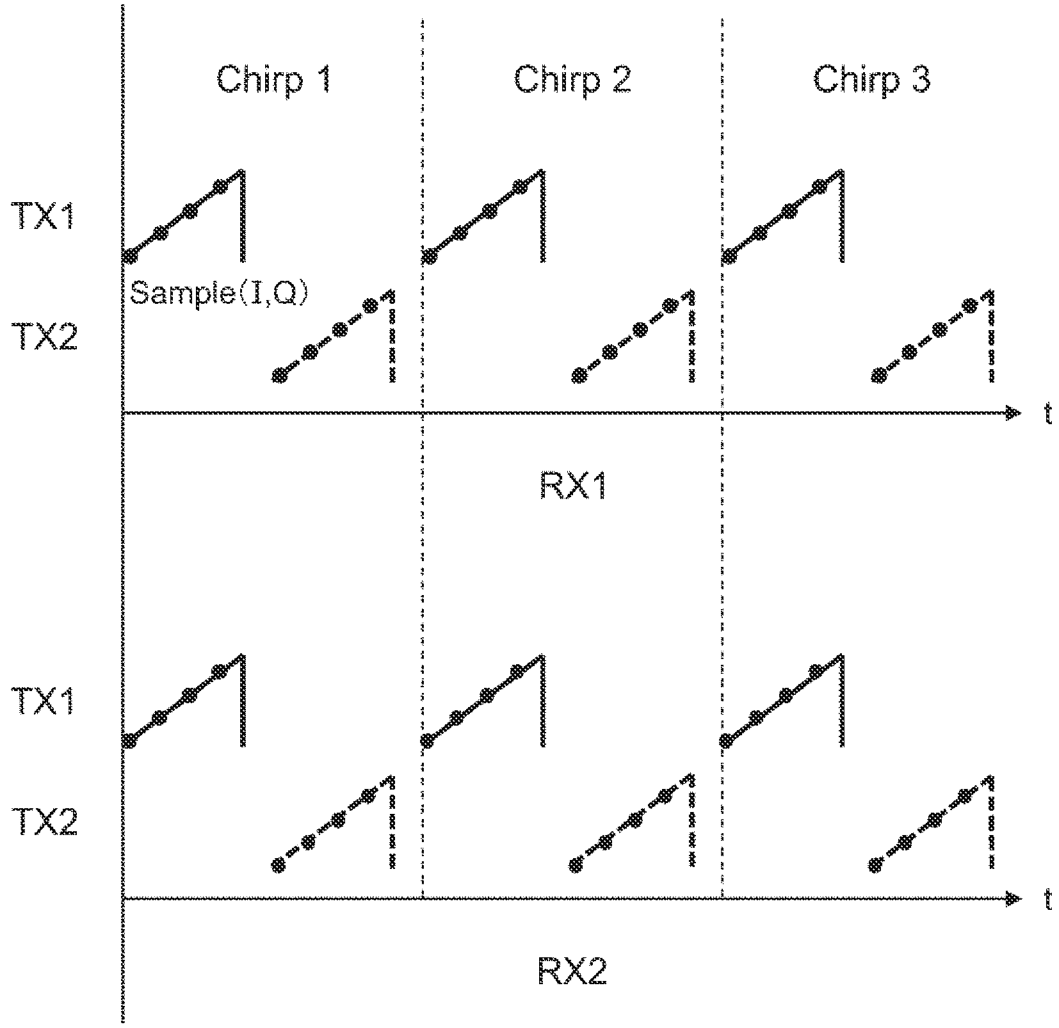
FIG. 15 is a diagram specifically describing a data region divided in reception antennas in an output data format of first type detection data.

FIG. 15 is a diagram specifically describing data regions divided in the reception antennas of the item "RX Antenna" in FIG. 7. FIG. 15 illustrates a case where IQ data as raw data is obtained by the radar device 11-1 as follows. According to FIG. 15, it is assumed that two transmission antennas of "TX1" and "TX2" are used for transmitting radio waves, and attention is paid to two reception antennas of "RX1" and "RX2" for receiving radio waves from these transmission antennas. In addition, it is assumed that chirp signals of "Chirp 1", "Chirp 2", and "Chirp 3" are alternately transmitted from each of the two transmission antennas of "TX1" and "TX2" with the time shifted. In this case, the two reception antennas "RX1" and "RX2" receive the chirp signals transmitted from the two transmission antennas "TX1" and "TX2". Note that, in FIG. 15, the diagram of the chirp signals received by the two reception antennas "RX1" and "RX2" is a schematic diagram in which the vertical axis is represented as a frequency, and is different from the waveform of the actual reception signal. The chirp signal received by each reception antenna is divided into chirp signals for two channels for each transmission antenna that has transmitted the chirp signal, and the IF signal is generated for each channel. The IF signal for each channel is sampled and A/D converted for predetermined periods, and IQ data (IQ data at a sampling point exemplified by Sample (I, Q) in FIG. 15) of "Sample 1", "Sample 2", . . . , and "Sample Z" is generated as raw data for respective chirp signals corresponding to "Chirp 1", "Chirp 2", and "Chirp 3". The IQ data generated as illustrated in FIG. 15 is output from the radar device 11-1 in the output data format of FIG. 7. For example, the IQ data of the IF signal generated by receiving the chirp signal of "Chirp 1" transmitted from the transmission antenna of "TX1" by the reception antenna of "RX1" is output from the output I/F unit 26-1 of the radar device 11-1 of FIG. 6 as the IQ data of "Sample 1", "Sample 2", . . . , and "Sample Z" of the item "Detection Data" in the data region of the item "TX1" of the item "TX Antenna" in the data region of the item "Chirp 1" of the item "Chirp" in the data region of the item "RX1" of the item "RX Antenna" in FIG. 7.

The output data format is described in different as follows expressions.

A data set of "Sample N" includes a plurality of I data and Q data.

- A data set of chirp signals corresponding to "TX N" includes a plurality of Sample data sets.
- A data set of "Chirp N" includes a plurality of TX data sets.
- A data set of "RX N" includes a plurality of Chirp data sets.
- A data set of "Scan N" includes a plurality of RX data sets.
- A data set of "Frame N" includes a plurality of Scan data sets.

Note that the output data format does not need to have all the above hierarchies. For example, in the case of a radar device having only one Scan mode, there may be no hierarchy of Scan data sets.

Second Embodiment of Radar Device 11

Figure 12:
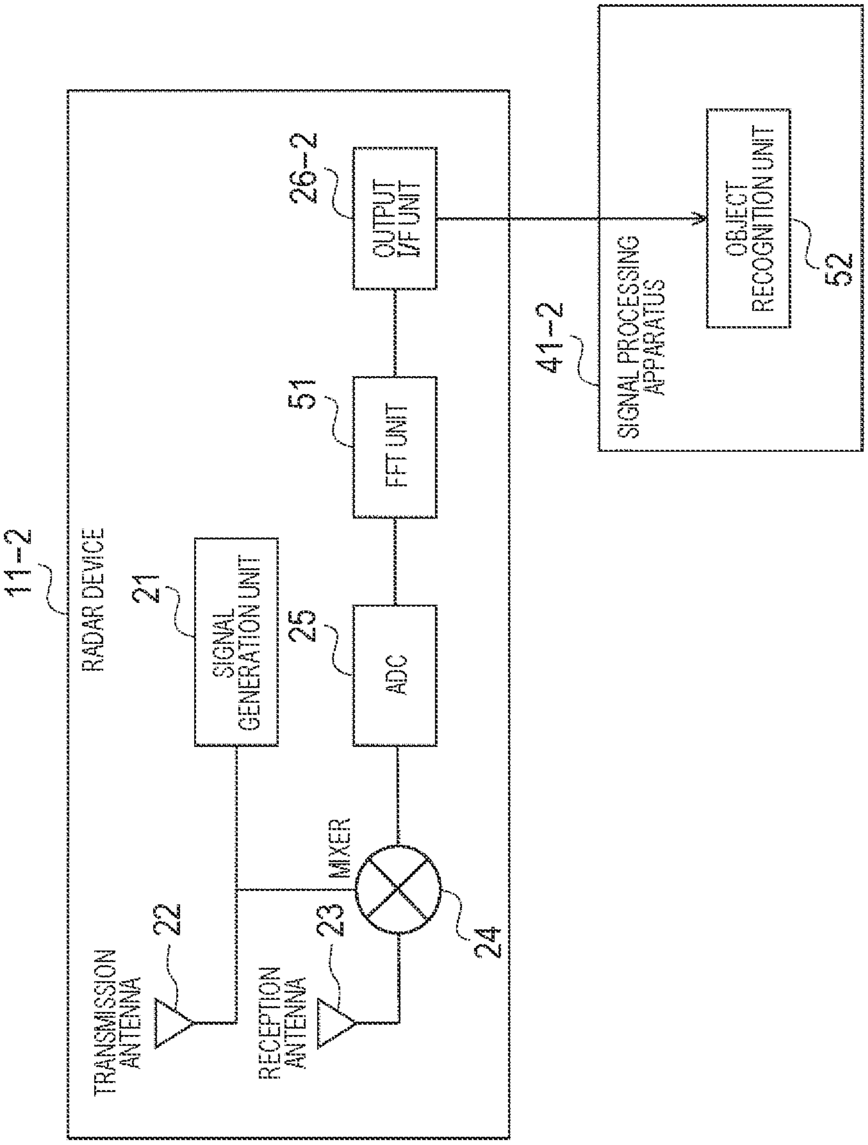
FIG. 12 is a block diagram illustrating a configuration example of a second embodiment of a radar device to which the present technology is applied.

FIG. 12 is a block diagram illustrating a configuration example of the second embodiment of the radar device 11 to which the present technology is applied. Note that, in the figure, units common to those of the radar device 11-1 in FIG. 6 are denoted by the same reference numerals, and a detailed description thereof will be omitted.

A radar device 11-2 according to the second embodiment in FIG. 12 includes the signal generation unit 21, the transmission antenna 22, the reception antenna 23, the mixing unit 24, the ADC 25, the FFT unit 51, and an output I/F unit 26-2. Therefore, the radar device 11-2 is common to the radar device 11-1 of FIG. 6 in that the signal generation unit 21, the transmission antenna 22, the reception antenna 23, the mixing unit 24, and the ADC 25 are included. However, the radar device 11-2 is different from the radar device 11-1 of FIG. 6 in that it newly includes an FFT unit 51 and includes the output I/F unit 26-2 instead of the output I/F unit 26-1 of FIG. 6.

The FFT unit 51 in the radar device 11-2 corresponds to the FFT unit 51 of the signal processing apparatus 41-1 in FIG. 6. That is, the FFT unit 51 performs the above-described distance FFT, velocity FFT, and angle FFT on the raw data (IF signal) supplied from the ADC 25 of the radar device 11-2. As a result, the distance, velocity, and angle in the scanning range of the radar device 11-2 are detected. That is, the point cloud data including the radio wave intensity data indicating not only the position (point) where the object is present in the scanning range but also the distance and the angle in the entire scanning range, and the radio wave intensity data indicating the relative velocity (the relative velocity with respect to the radar device 11-2) with respect to the object in the entire scanning range regardless of whether or not the object is present in the scanning range is detected. That is, the radio wave intensity data at the position (point) where the object is present indicates a relatively high value as compared with the surrounding radio wave intensity data, and the radio wave intensity data at the position (point) where the object does not exist indicates a value as low as the disturbance component. Note that, for example, the FFT unit 51 detects one (one set of) point cloud data for each raw data corresponding to one frame in FIG. 7 supplied from the ADC 25 and supplies the data to the output I/F unit 26-2. Furthermore, the FFT unit 51 may include a processing unit that performs an additional process on data obtained by the distance FFT, the velocity FFT, and the angle FFT, such as a noise detection unit 71 illustrated in FIG. 16 described later. In this case, for example, the FFT unit 51 may detect, as the point cloud data, data of only points at which radio wave intensity data determined that the object is present is obtained. Therefore, the point cloud data may either include the radio wave intensity data for all the points (distance, angle, and velocity) in the scanning range or include only the radio wave intensity data for the points (distance, angle, and velocity) at which it is determined that the object is present. For example, in the description (to be described later) of the data content of the second type detection data (point cloud data) in FIG. 14, the description in which the point cloud data is limited to the data of only the point where the object is present may be read as the description in which the point cloud data is the data of all the points in the scanning range, or vice versa.

The output I/F unit 26-2 outputs the point cloud data from the FFT unit 51, as the second type detection data, to the signal processing apparatus 41-1, which is an external device.

A signal processing apparatus 41-2 includes the object recognition unit 52. As in the object recognition unit 52 in the signal processing apparatus 41-1 of FIG. 6, the object recognition unit 52 recognizes the type of the object as an integrated object on the basis of the point cloud data from the radar device 11-2.

Note that the data transmission between the radar device 11-2 and the signal processing apparatus 41-2 may be performed in a wired or wireless manner, or may be performed by communication conforming to a predetermined communication protocol such as IP. The radar device 11-2 may not only output the point cloud data as the second type detection data to the external device, but also may output the first type detection data (raw data) according to the output data format of FIG. 7 to the external device as in the radar device 11-1 of the first embodiment. In this case, the radar device 11-2 may selectively output only one of the first type detection data and the second type detection data, or may output both at the same time.

Third Embodiment of Radar Device 11

Figure 13:
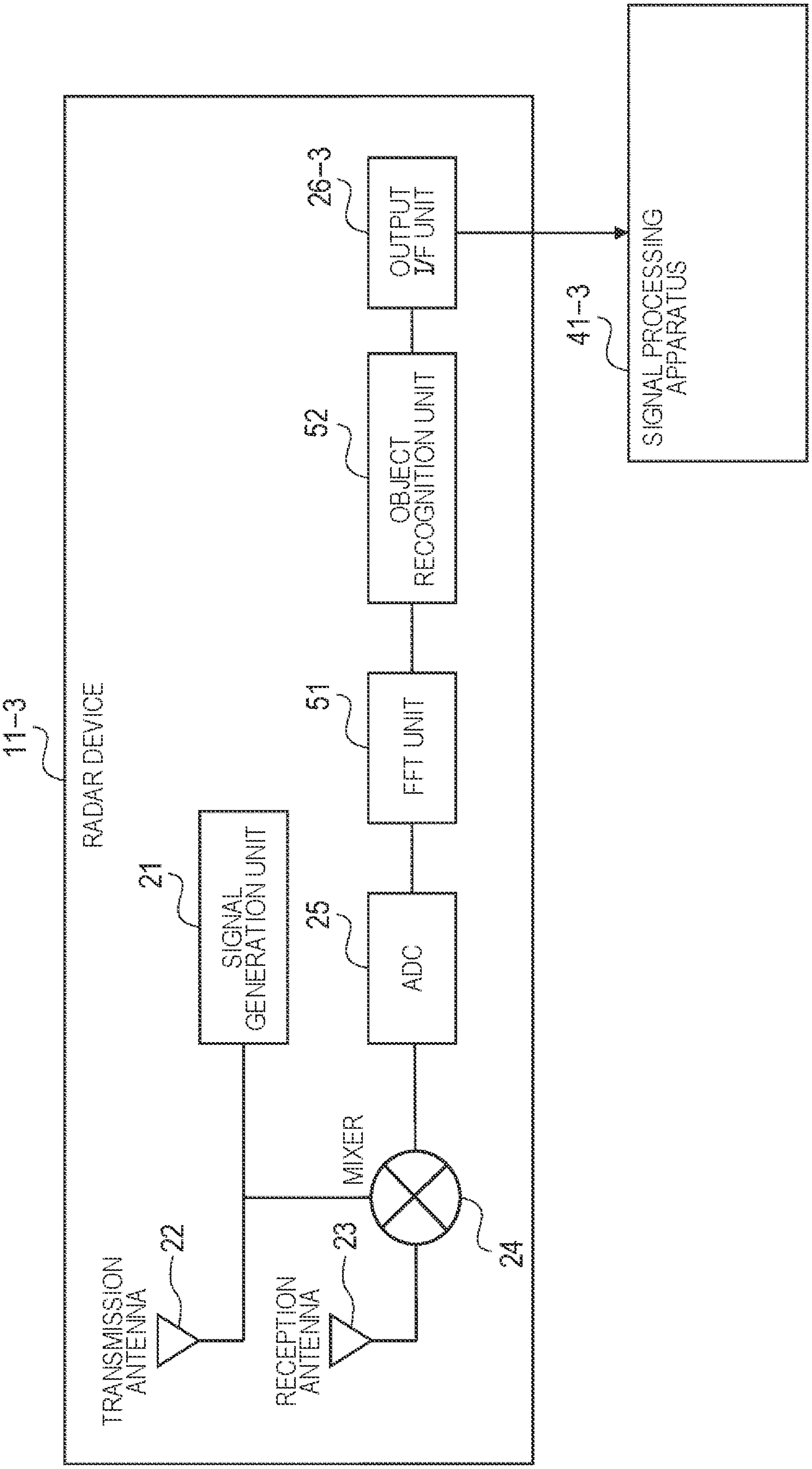
FIG. 13 is a block diagram illustrating a configuration example of a third embodiment of a radar device to which the present technology is applied.

FIG. 13 is a block diagram illustrating a configuration example of the third embodiment of the radar device 11 to which the present technology is applied. Note that, in the figure, units common to those of the radar device 11-2 in FIG. 12 are denoted by the same reference numerals, and a detailed description thereof will be omitted.

A radar device 11-3 according to the third embodiment of FIG. 13 includes the signal generation unit 21, the transmission antenna 22, the reception antenna 23, the mixing unit 24, the ADC 25, the FFT unit 51, the object recognition unit 52, and an output I/F unit 26-3. Therefore, the radar device 11-3 is common to the radar device 11-2 of FIG. 12 in that the signal generation unit 21, the transmission antenna 22, the reception antenna 23, the mixing unit 24, the ADC 25, and the FFT unit 51 are included. However, the radar device 11-3 is different from the radar device 11-2 of FIG. 12 in that it newly includes the object recognition unit 52 and includes the output I/F unit 26-3 instead of the output I/F unit 26-2 of FIG. 12.

The object recognition unit 52 in the radar device 11-3 corresponds to the object recognition unit 52 of the signal processing apparatus 41-2 in FIG. 12. That is, in the object recognition unit 52, the object recognition unit 52 recognizes the type of the object as an integrated object on the basis of the point cloud data from the radar device 11-2, as in the object recognition unit 52 in the signal processing apparatus 41-1 of FIG. 6. The object recognition unit 52 recognizes the type of the object, and calculates the position, size, and velocity of the recognized object as an integrated object on the basis of the point cloud data. For example, as the position of the object, the coordinate value in an orthogonal coordinate system (XYZ coordinate system) indicating a specific position such as a barycentric position of the object as an integrated object is calculated. As the size of the object, a width (length) in each axial direction in an orthogonal coordinate system (XYZ coordinate system) indicating a rectangular range including the object as an integrated object is calculated. The object recognition unit 52 supplies detection data indicating these recognition results to the output I/F unit 26-3. Note that the object recognition unit 52 calculates one (one set of) detection data every time one (one set of) point cloud data is supplied from the FFT unit 51, and supplies the one (one set of) detection data to the output I/F unit 26-3.

The output I/F unit 26-3 outputs the detection data, as the third type detection data, from the object recognition unit 52 to a signal processing apparatus 41-3 which is an external device.

Note that the data transmission between the radar device 11-3 and the signal processing apparatus 41-3 may be performed in a wired or wireless manner, or may be performed by communication conforming to a predetermined communication protocol such as IP. The radar device 11-3 may not only output the object recognition result that is the third type detection data to the external device, but also may output the first type detection data (raw data) and the second type detection data (point cloud data) according to the output data format of FIG. 7 to the external device as in the radar devices 11-1 and 11-2 of the first and second embodiments. In this case, the radar device 11-3 may selectively output any one or two pieces of detection data among the first type detection data, the second type detection data, and the third type detection data, or may simultaneously output all the pieces of detection data.

FIG. 14 is a diagram illustrating output data formats of the second type detection data and the third type detection data output from the second and third embodiments (radar devices 11-2 and 11-3) of the radar device 11 to which the present technology is applied.

In FIG. 14, the column of the item "point cloud" represents the data content of the second type detection data (point cloud data) output to the external device by the radar device 11-2 of the second embodiment. The second type detection data (point cloud data) includes the following first data to fourth data for each position (point) where the object is present. The first data is data (position) indicating a distance and an angle indicating a position. The second data is data (Velocity) indicating the relative velocity in each of the X, Y, and Z axis directions in the orthogonal coordinate system indicating the relative velocity with respect to the object. The third data is data (acceleration) indicating the relative acceleration in each of the X, Y, and Z axis directions in the orthogonal coordinate system indicating the relative acceleration with respect to the object. The data indicating the relative acceleration can be calculated on the basis of the temporal change in the data indicating the relative velocity. The fourth data is reception intensity of the radio wave reflected at the position where the object is present, and is data (Power) indicating the intensity of a signal that is a basis for the presence of the object. The fourth data may be, for example, data indicating the intensity of the frequency component of the angle spectrum corresponding to each position (distance and angle) where the object is present. However, the second type detection data may include any one or more of the first data to the fourth data.

The column of the item "Object" represents data content of the third type detection data output to the external device by the radar device 11-3 of the third embodiment. The third type detection data includes the following first to eighth data for each object as an integrated object whose type is recognized. The first data is data (position) indicating XYZ coordinate values in an orthogonal coordinate system indicating the position of the object. The second data is data (Size) indicating the width in each of the X, Y, and Z axis directions in the orthogonal coordinate system indicating the size of the object. The third data is data (Direction) indicating a component value of a direction vector in the orthogonal coordinate system indicating an angle (direction) of an object. The fourth data is data (Velocity) indicating the relative velocity in each of the X, Y, and Z axis directions in the orthogonal coordinate system indicating the relative velocity with respect to the object. The fifth data is data (acceleration) indicating the relative acceleration in each of the X, Y, and Z axis directions in the orthogonal coordinate system indicating the relative acceleration with respect to the object. The data indicating the relative acceleration can be calculated on the basis of the temporal change in the data indicating the relative velocity. The sixth data is data (Power) indicating the intensity of the signal that is the basis for the presence of the object. The seventh data is data (ID) indicating identification information for identifying an object. The eighth data is data (Category) indicating the type of the object. However, the third type detection data may include any one or more of the first data to the eighth data.

Details of Second Embodiment of Radar Device 11

Figure 16:
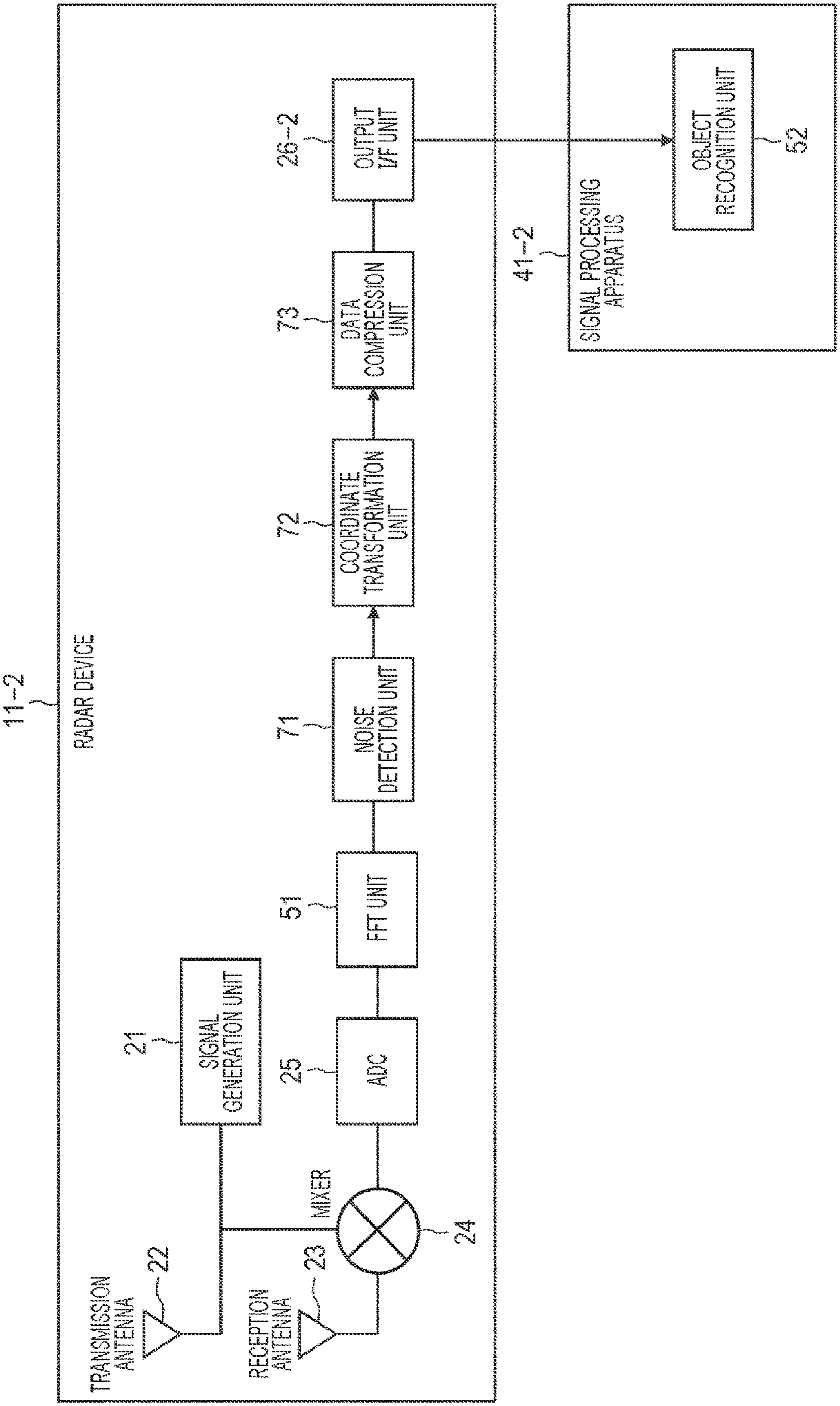
FIG. 16 is a block diagram illustrating a specific example of a processing unit for point cloud data obtained by an FFT unit in the radar device of FIG. 12.

FIG. 16 is a block diagram illustrating a specific example of a processing unit for the point cloud data obtained by the FFT unit 51 in the radar device 11-2 of FIG. 12 which is the second embodiment of the radar device 11. In the figure, units common to those of the radar device 11-2 in FIG. 12 are denoted by the same reference numerals, and a detailed description thereof will be omitted.

The radar device 11-2 of FIG. 16 includes the signal generation unit 21, the transmission antenna 22, the reception antenna 23, the mixing unit 24, the ADC 25, an FFT unit 51, a noise detection unit 71, a coordinate transformation unit 72, a data compression unit 73, and the output I/F unit 26-2. Therefore, the radar device 11-2 of FIG. 16 is common to the radar device 11-2 of FIG. 12 in that the signal generation unit 21, the transmission antenna 22, the reception antenna 23, the mixing unit 24, the ADC 25, the FFT unit 51, and the output I/F unit 26-2 are included. However, the radar device 11-2 of FIG. 16 is different from the radar device 11-2 of FIG. 12 in that it newly includes the noise detection unit 71, the coordinate transformation unit 72, and the data compression unit 73.

As described with reference to FIG. 12, the FFT unit 51 in the radar device 11-2 of FIG. 16 performs the above-described distance FFT, velocity FFT, and angle FFT on the raw data (IF signal) supplied from the ADC 25 of the radar device 11-2. As a result, the distance, velocity, and angle in the scanning range of the radar device 11-2 are detected. That is, the point cloud data including the radio wave intensity data indicating not only the position (point) where the object is present in the scanning range but also the distance and the angle in the entire scanning range, and the radio wave intensity data indicating the relative velocity (the relative velocity between the radar device 11-2 and the object) with respect to the object in the entire scanning range regardless of whether or not the object is present in the scanning range is detected. Note that, for example, the FFT unit 51 detects one (one set of) point cloud data for each raw data corresponding to one frame in FIG. 7 supplied from the ADC 25 (and for each scan mode).

The noise detection unit 71, the coordinate transformation unit 72, and the data compression unit 73 are specific examples of the processing unit for the point cloud data detected by the FFT unit 51. The radar device 11-2 may include any one or more of the noise detection unit 71, the coordinate transformation unit 72, and the data compression unit 73, or may include none of them.

The noise detection unit 71 performs a noise detection process on the point cloud data from the FFT unit 51. As described for the item "point cloud" in FIG. 14, the point cloud data includes data of "Power" (hereinafter, simply referred to as an intensity) corresponding to the radio wave intensity of the received radio wave with respect to the distance, the velocity, and the angle (hereinafter, also simply referred to as position and velocity) of the object existing in the scanning range of the radar device 11-2. The noise detection unit 71 detects whether or not the intensity at each position and velocity is noise, and removes (or 0) data of the intensity at the position and velocity at which noise has been detected. For example, a constant false alarm rate (CFAR), which is a threshold value algorithm for extracting a peak point from a target signal, can be used as an algorithm of noise detection in the noise detection unit 71. There are various types of CFARs, and the CFAR used in the noise detection by the noise detection unit 71 is not limited to a specific type, but for example, includes a cell averaging constant false alarm rate (CA-CFAR). As the noise detection using the CA-CFAR, for example, the following processing is performed. Every time one (one set of) point cloud data is supplied from the FFT unit 51, the noise detection unit 71 sequentially focuses on each position and velocity of the point cloud data as the focus position and velocity. The noise detection unit 71 calculates a threshold value based on the intensity at the position and velocity in the peripheral range with respect to the focus position and velocity. The position and velocity in the peripheral range represent a position and velocity range that are larger than the first distance and equal to or smaller than the second distance with respect to the focus position and are larger than the first velocity difference and equal to or smaller than the second velocity difference with respect to the focus velocity. However, the first distance is smaller than the second distance, and the first velocity difference is smaller than the second velocity difference. As the threshold value, a value (average value of the intensities, etc.) corresponding to the sum of the intensities at the position and velocity in the peripheral range with respect to the focus position and velocity is calculated. The noise detection unit 71 compares the intensity at the focus position and velocity with a threshold value, and determines that the intensity at the focus position and velocity is not noise in a case where the intensity at the focus position and velocity is equal to or greater than the threshold value, and determines that the intensity at th focus position and velocity is noise in a case where the intensity at the focus position and velocity is less than the threshold value. By such noise detection processing in the noise detection unit 71, data corresponding to noise is removed (invalidated) from the point cloud data detected by the FFT unit 51. Note that such setting of the threshold value is not limited to a specific method such as CA-CFAR, and for example, the threshold value may be set to a value according to a distance, a predetermined fixed value, or the like.

The coordinate transformation unit 72 coordinate-transforms each position and velocity of the point cloud data from the FFT unit 51 or the noise detection unit 71 to the component value in the orthogonal coordinate system data from that in the polar coordinate system on the basis of the distance and angle of each position. Note that only one of the position and velocity may be transformed into the orthogonal coordinate system. The coordinate transformation processing of the coordinate transformation unit 72 may be performed before the noise detection processing of the noise detection unit 71.

The data compression unit 73 executes a data compression process on the point cloud data from the FFT unit 51, the noise detection unit 71, or the coordinate transformation unit 72 to reduce the amount of data, and supplies the amount of data to the output IF unit 26-2. The output I/F unit 26-2 outputs the compressed point cloud data, as second type detection data, from the data compression unit 73 to the signal processing apparatus 41-2, which is an external device. Note that, in a case where the radar device 11-2 includes the data compression unit 73, the signal processing apparatus 41-2 includes a decoding unit that decodes the compressed second type detection data from the radar device 11-2.

Any of the noise detection unit 71, the coordinate transformation unit 72, and the data compression unit 73 described above may be disposed in the radar device 11-1 according to the first embodiment in FIG. 12 or the radar device 11-3 according to the third embodiment in FIG. 13.

First Mode Format of Second Type Detection Data

Figure 17:
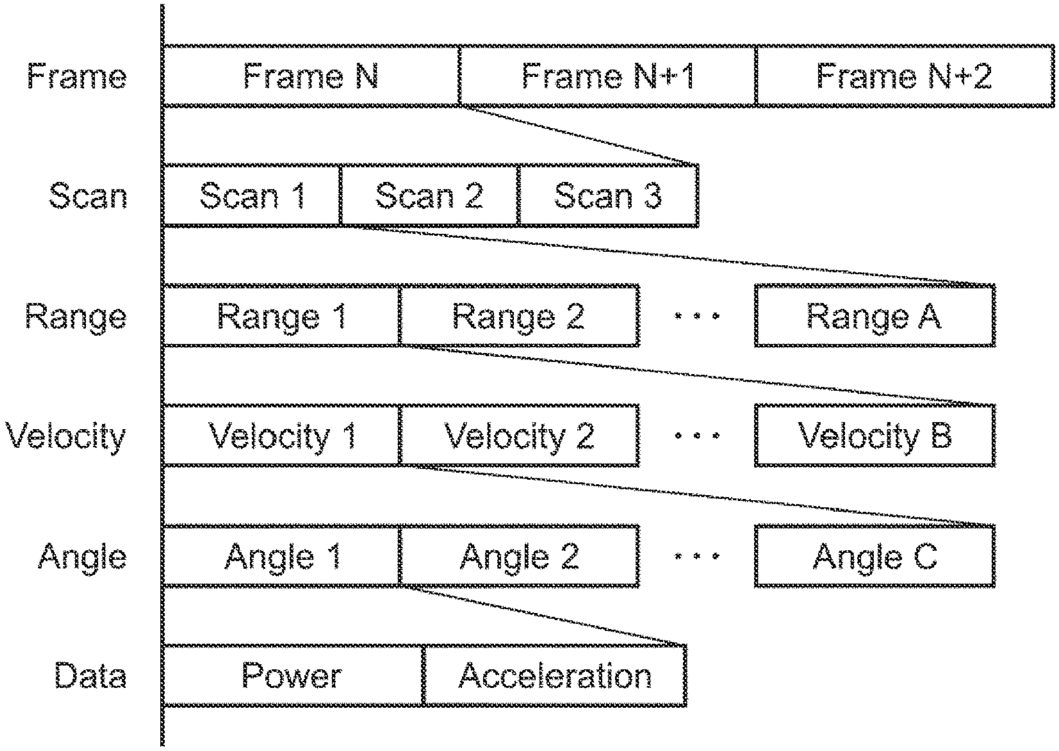
FIG. 17 is a diagram illustrating a first mode format that is an output data format of second type detection data.

FIG. 17 is a diagram illustrating an output data format (first mode format) of detection data (second type detection data) that is point cloud data output by the output I/F unit 26-2 of the radar device 11-2 of FIG. 16. The first mode format at least corresponds to an output data format of the second type detection data output by the output I/F unit 26-2 of the radar device 11-2 of FIG. 12 in a case where the noise detection unit 71 does not perform the noise detection process.

In FIG. 17, the item "Frame" indicates that the detection data output from the output I/F unit 26-2 is divided into frames that are basic constituent units, as in FIG. 7. The item "Scan (mode)" under the item "Frame" indicates that a data region divided for each frame is further divided into data regions of the scan mode, as in FIG. 7. In the item "Scan (mode)", "Scan1", "Scan2", and "Scan3" indicate data regions of scan modes 1, 2, and 3, respectively. Note that the scan mode is described with reference to FIGS. 8 to 11, and thus description thereof is omitted here.

The item "Range" under the item "Scan (mode)" indicates that the data region divided in the scan modes is further divided into data regions of the distance. In the item "Range", "Range 1", "Range 2", . . . , and "Range A" (A is a predetermined natural number) indicate the data regions in which the point cloud data at the distance corresponding to each Range is disposed. Different distance sections are assigned to "Range 1", "Range 2", . . . , and "Range A". For example, the scannable distance range of the radar device 11-2 is divided into a plurality of (A) sections, and respective sections are assigned to "Range 1", "Range 2", . . . , and "Range A".

The item "Velocity" under the item "Range" indicates that the data region divided in the distances is further divided the data regions of the velocity. In the item "Velocity", "Velocity 1", "Velocity 2", . . . , and "Velocity B" (B is a predetermined natural number) indicate data regions in which the point cloud data at the velocity corresponding each Velocity is disposed. Different velocity sections are assigned to "Velocity 1", "Velocity 2", . . . , and "Velocity B". For example, the range of the relative velocity between the radar device 11-2 and the object is divided into a plurality of (B) sections, and the respective sections are assigned to "Velocity 1", "Velocity 2", . . . , and "Velocity B". Note that the velocity obtained by the velocity FFT of the FFT unit 51 is a relative velocity in a direction in which a position (point) where the object is present and the radar device 11-2 are connected. In FIG. 14, the velocity of the point cloud data is represented by the velocity (XYZ component) in each of the XYZ axial directions of the orthogonal coordinate system. In this case, the radar device 11-2 includes the coordinate transformation unit 72 of FIG. 16, and the coordinate transformation unit 72 coordinate-transforms the velocity (the relative velocity between the object and the radar device 11-2) obtained by the velocity FFT to calculate the velocity in each of the XYZ axial directions of the orthogonal coordinate system. In addition, in this case, the data region of the item "Velocity" may be hierarchized into data regions of each XYZ component.

The item "Angle" under the item "Velocity" indicates that the data region divided in the velocities is further divided into the data regions of the angle. In the item "Angle", "Angle 1", "Angle 2", . . . , and "Angle C" (C is a predetermined natural number) indicate the data regions in which the point cloud data at the angle corresponding to each Angle is disposed. Different angle sections are assigned to "Angle 1", "Angle 2", . . . , and "Angle C". For example, the range of the angle that can be scanned by the radar device 11-2 is divided into a plurality of (C) sections, and the respective sections are assigned to "Angle 1", "Angle 2", . . . , and "Angle C".

The item "Data" under the item "Angle" indicates that the data region divided in the angle is further divided into data regions of the intensity and acceleration data. Data of "Power" (intensity) and "Acceleration" (acceleration) is disposed in this data regions. The acceleration data may be calculated on the basis of a change in velocity between frames, but may not be included in the point cloud data. In addition, the acceleration data may also be converted into component value data of the orthogonal coordinate system by the coordinate transformation unit 72 in FIG. 16.

Figure 18:
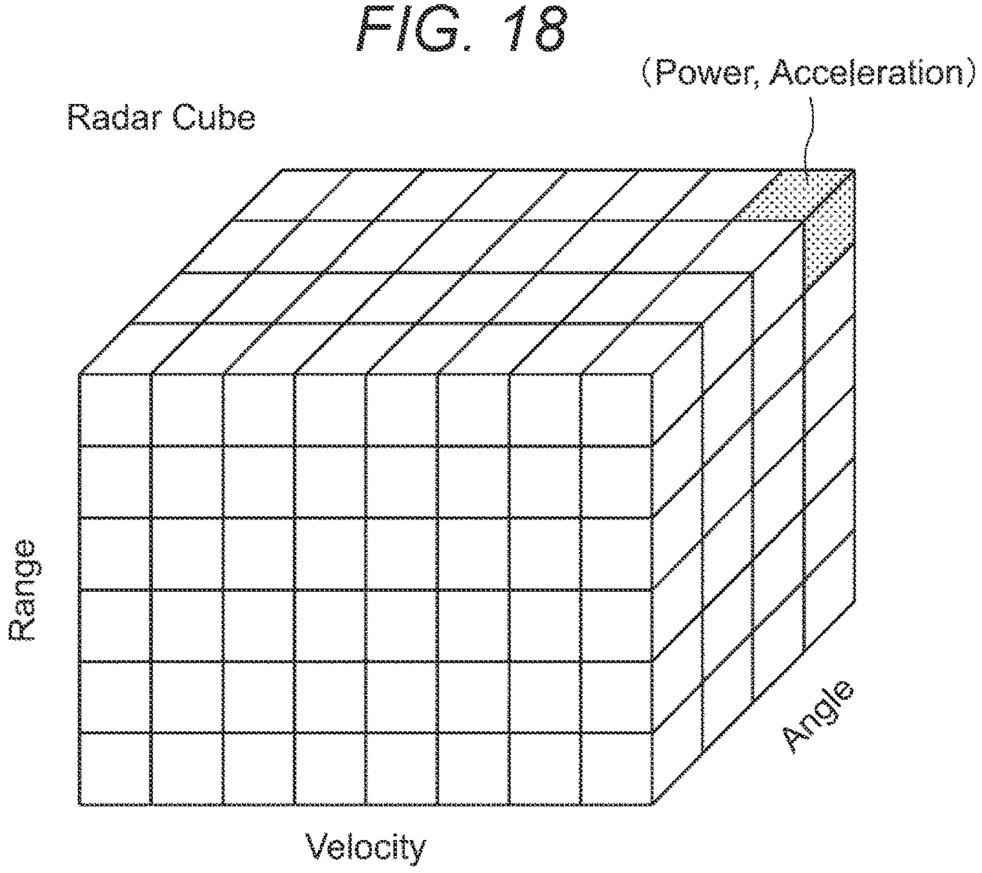
FIG. 18 is a diagram illustrating a data structure of point cloud data.

Here, the data structure of the point cloud data can be expressed by "Radar Cube" in FIG. 18. In FIG. 18, the lengthwise direction (vertical direction) represents "Range" (distance), the lateral direction (horizontal direction) represents "Velocity" (velocity), and the depth direction (front-rear direction) represents "Angle" (angle). "Range" (distance) is divided into sections corresponding to "Range 1", "Range 2", . . . , and "Range A" in FIG. 17, "Velocity" (velocity) is divided into sections corresponding to "Velocity 1", "Velocity 2", . . . , and "Velocity B" in FIG. 17, and "Angle" (angle) is divided into sections corresponding to "Angle 1", "Angle 2", . . . , and "Angle C" in FIG. 17. As a result, the "Radar Cube" is divided into boxes having a length of one section in each of the vertical direction, the horizontal direction, and the front-rear direction, and data of "Power" (intensity) and "Acceleration" (acceleration) is associated with each box. The first mode format of FIG. 17 is a format in which the data of the intensity and the acceleration of each box of "Radar Cube" of FIG. 18 is sequentially output in one frame.

Second Mode Format of Second Type Detection Data

Figure 19:
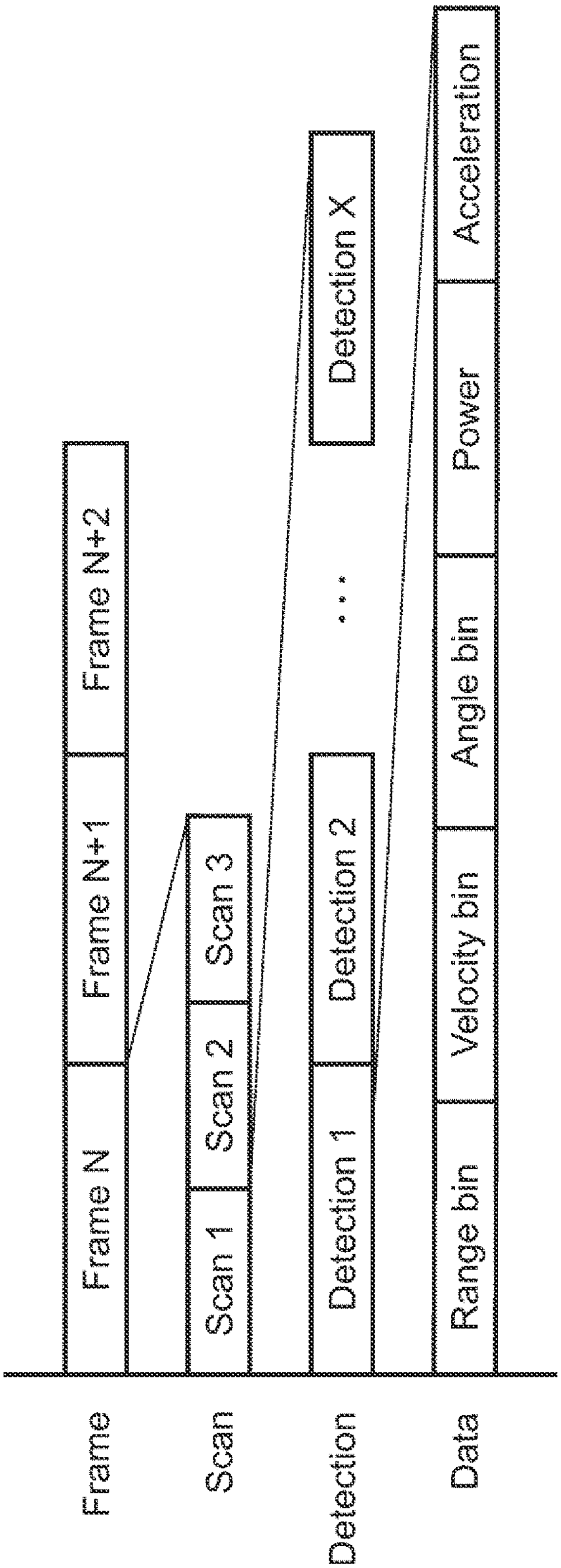
FIG. 19 is a diagram illustrating a second mode format that is an output data format of second type detection data.

FIG. 19 is a diagram illustrating an output data format (second mode format) of detection data (second type detection data) that is point cloud data output by the output I/F unit 26-2 of the radar device 11-2 of FIG. 16. The second mode format at least corresponds to the output data format of the second type detection data output by the output I/F unit 26-2 in a case where the noise detection unit 71 performs the noise detection process.

In FIG. 19, the item "Frame" and the item "Scan (mode)" under the item "Frame" are the same as those in FIG. 17, and thus description thereof is omitted.

The item "Detection" under the item "Scan (mode)" indicates that the data region divided in the scan modes is further divided into data regions for each detection point. In the item "Detection", "Detection 1", "Detection 2", . . . , and "Detection X" (X is a predetermined natural number) indicate the data regions in which the point cloud data related to the object present at the detection point corresponding each Detection is disposed. The point cloud data related to the object present at the detection point is data of the position (distance and angle), velocity, intensity, and acceleration determined not to be noise by the noise detection unit 71 in FIG. 16. In "Radar Cube" of FIG. 18, each box corresponds to a detection point, and the point cloud data related to the object present at the detection point is data (position and velocity data) identifying the box having the intensity determined not to be noise among the boxes and data of the intensity and acceleration associated with the box. The boxes (detection points) having the intensity determined not to be noise are assigned to "Detection 1", "Detection 2", . . . , and "Detection X".

The item "Data" under the item "Detection" indicates that the data region divided for each detection point is further divided into data regions of the distance, velocity, angle, intensity, and acceleration. In the data regions of each detection point, data of "Range bin" (distance), "Velocity bin" (velocity), "Angle bin" (angle), "Power" (intensity), and "Acceleration" (acceleration) is disposed. In the data region of "Range bin" (distance), data indicating a section number corresponding to the distance of the detection point is disposed in a case where the range of the scannable distance of the radar device 11-2 is divided into a plurality of sections and each section is numbered. In the data region of "Velocity bin" (velocity), data of a section number corresponding to the velocity of the detection point is disposed in a case where the relative velocity between the radar device 11-2 and the object is divided into a plurality of (B) sections and each section is numbered. In the data region of "Angle bin" (angle), data of the section number corresponding to the angle of the detection point is disposed in a case where the range of angle that can be scanned by the radar device 11-2 is divided into a plurality of sections and each section is numbered. In the data regions of "Power" (intensity) and "Acceleration" (acceleration), data of the intensity and the acceleration of the detection point are disposed, respectively.

FIG. 20 illustrates an example of data of "Range bin" (distance), "Velocity bin" (velocity), "Angle bin" (angle), "Power" (intensity), and "Acceleration" (acceleration) disposed in the data region of the item "Data". In FIG. 20, data disposed in respective data regions of "Detection 1", "Detection 2", . . . , and "Detection X" is illustrated in the row direction. For example, in the data region of "Detection 1", data of "Range bin" (distance) is 10, data of "Velocity bin"

(velocity) is 13, data of "Angle bin" (angle) is 5, data of "Power" (intensity) is −40.2 (dB), and data of "Acceleration" (acceleration) is 0.12 (m/s).

In the output data format of the second type detection data described above with reference to FIGS. 17 to 20, the structure information identifying the data structure such as the type, the number (the number of pieces of data, and the like), the bit length, and the like for each data region in each frame may be included in the second type detection data together with the point cloud data as the header information and the like. In a case where the structure information is common in each frame, the radar device 11-2 and the signal processing apparatus 41-2 may have the structure information in advance, so that it is not necessary to include the structure information in the second type detection data. In addition, the number of data and the like may be limited such that the structure information in each frame is common. For example, in the second mode format of FIG. 19, the number of detection points determined not to be noise may change for each frame. In this case, the data of the detection point having high intensity may be preferentially included in the second type detection data, and the number of detection points included in the second type detection data may be constant regardless of the frame. Note that the second type detection data may include any information such as time information indicating the time when the point cloud data is acquired.

The present technology can also have the following configurations.

(1)

A radar device including, of a first interface that outputs raw data immediately after a reception signal from a reception antenna is sampled for predetermined periods and subjected to A/D conversion in a first output data format, a second interface that outputs point cloud data generated by executing a predetermined signal process on the raw data in a second output data format, and a third interface that outputs data of an object recognition result obtained by executing an object recognition process on the point cloud data in a third output data format, at least the first interface or the second interface.

(2) The radar device according to Item (1), in which the first output data format includes IQ data as the raw data.

(3) The radar device according to Item (1) or (2), in which in the first output data format, the raw data obtained for a chirp signal for one period, the chirp signal being periodically output from the transmission antenna, is divided.

(4) The radar device according to any one of Items (1) to (3), in which the reception antenna includes a plurality of antennas, and in the first output data format, the raw data obtained by sampling the reception signal of each of the plurality of antennas for predetermined periods is divided in the antennas.

(5) The radar device according to Item 3, in which the reception antenna includes a plurality of antennas, and in the first output data format, the raw data obtained for the chirp signal for a plurality of periods by each of the plurality of antennas is divided in the antennas.

(6) The radar device according to any one of Items (1) to (5), in which a transmission antenna has a plurality of different scan modes, and in the first output data format, the raw data obtained by sampling for predetermined periods is divided in the scan modes.

(7) The radar device according to Item 3, in which a transmission antenna has a plurality of different scan modes, and in the first output data format, the raw data obtained for the chirp signal for a plurality of periods by each of the plurality of scan modes is divided in the scan modes.

(8) The radar device according to Item 5, in which a transmission antenna has a plurality of different scan modes, and in the first output data format, the raw data obtained for the chirp signal for a plurality of periods by each of the plurality of scan modes is divided in the scan modes, and the raw data divided in the scan modes is divided in the antennas.

(9) The radar device according to any one of Items (1) to (8), in which the second interface outputs the point cloud data generated by performing an FFT process as the signal process on the raw data in the second output data format.

(10) The radar device according to any one of Items (1) to (9), in which the second output data format includes position data indicating a position where an object is present.

(11) The radar device according to Item 10, in which in the second output data format, data indicating a distance and a direction of a position where the object is present is set as the position data.

(12) The radar device according to any one of Items (1) to (11), in which the second output data format includes velocity data indicating a relative velocity with respect to an object at a position where the object is present.

(13) The radar device according to any one of Items (1) to (12), in which the second output data format includes acceleration data indicating a relative acceleration with respect to an object at a position where the object is present.

(14) The radar device according to any one of Items (1) to (13), in which the second output data format includes data indicating reception intensity of a radio wave reflected at a position where an object is present.

(15) The radar device according to any one of Items (1) to (14), further including a noise detection unit that removes noise from the point cloud data, in which the second interface outputs the point cloud data from which the noise was removed in the second output data format.

(16) The radar device according to Item 15, in which the noise detection unit employs a constant false alarm rate (CFAR) process.

(17) The radar device according to Item 14, in which the second output data format includes only data indicating the reception intensity equal to or greater than a threshold value.

(18) The radar device according to Item 17, in which the threshold value is changed according to a position where the radio wave is reflected.

(19) The radar device according to Item 18, in which the threshold value to be compared with the reception intensity of the radio wave reflected at a first position is calculated on the basis of the reception intensity of the radio wave reflected at a position around the first position.

(20) A data output method for a radar device, the radar device including, of a first interface, a second interface, and a third interface, at least the first interface or the second interface, the method including the first interface outputting raw data immediately after a reception signal from a reception antenna is sampled for predetermined periods and subjected to A/D conversion in a first output data format, the second interface outputting point cloud data generated by executing a predetermined signal process on the raw data in a second output data format, and the third interface outputting data of an object recognition result obtained by executing an object recognition process on the point cloud data in a third output data format.

REFERENCE SIGNS LIST

11, 11-1 to 11-3 Radar device
21 Signal generation unit
22 Transmission antenna
23 Reception antenna
24 Mixing unit
26-1 to 26-3 Output I/F unit
41-1 to 41-3 Signal processing apparatus
51 FFT unit
52 Object recognition unit
71 Noise detection unit
72 Coordinate transformation unit
73 Data compression unit

The invention claimed is:

1. A radar device comprising:

reception circuitry configured to receive a reception signal from a reception antenna, sample the reception signal for predetermined periods to provide a sampled signal, and subject the sampled signal to analog-to-digital (A/D) conversion for outputting data in a first output data format that includes raw data of the reception signal, wherein the data in the first output data format is provided to an output configured for access by an external processing device, and is independently accessible for use by the external processing device without requiring generation of point cloud data;

transform circuitry configured to receive the data in the first output data format from the reception circuitry, to generate point cloud data from the raw data, and to output data in a second output data format; and object recognition circuitry configured to receive the output of the transform circuitry in the second output data format, perform object recognition on the point cloud data, and to output data in a third output data format based upon the object recognition performed on the point cloud data.

2. The radar device according to claim 1, wherein the first output data format includes in-phase and quadrature (IQ) data.

3. The radar device according to claim 1, wherein in the first output data format, the raw data is obtained for a chirp signal for one period, the chirp signal being periodically output from a transmission antenna, and is divided.

4. The radar device according to claim 3, wherein the reception antenna includes a plurality of antennas, and in the first output data format, the raw data is obtained for the chirp signal for a plurality of periods by each of the plurality of antennas and is divided in the antennas.

5. The radar device according to claim 4, wherein a transmission antenna has a plurality of different scan modes, and in the first output data format, the raw data is obtained for the chirp signal for a plurality of periods by each of the plurality of scan modes, is divided in the scan modes, and the raw data divided in the scan modes is divided in the antennas.

6. The radar device according to claim 3, wherein a transmission antenna has a plurality of different scan modes, and in the first output data format, the raw data is obtained for the chirp signal for a plurality of periods by each of the plurality of scan modes and is divided in the scan modes.

7. The radar device according to claim 1, wherein the reception antenna includes a plurality of antennas, and in the first output data format, the raw data is obtained by sampling the reception signal of each of the plurality of antennas for predetermined periods is divided in the antennas.

8. The radar device according to claim 1, wherein a transmission antenna has a plurality of different scan modes, and in the first output data format, the raw data is obtained by sampling for predetermined periods and is divided in the scan modes.

9. The radar device according to claim 1, wherein the transform circuitry performs a Fast Fourier Transform (FFT) on the raw data to output data in the second output data format.

10. The radar device according to claim 1, wherein the second output data format includes position data indicating a first position where an object is present.

11. The radar device according to claim 10, wherein in the second output data format, data indicating a distance and a direction of a first position where the object is present is set as the position data.

12. The radar device according to claim 1, wherein the second output data format includes velocity data indicating a relative velocity with respect to an object at a first position where the object is present.

13. The radar device according to claim 1, wherein the second output data format includes acceleration data indicating a relative acceleration with respect to an object at a first position where the object is present.

14. The radar device according to claim 1, wherein the second output data format includes data indicating reception intensity of a radio wave reflected at a first position where an object is present.

15. The radar device according to claim 14, wherein the output data in the second output data format includes data indicating that the reception intensity of the reception signal is equal to or greater than a threshold value.

16. The radar device according to claim 15, wherein the threshold value is changed according to a first position where the radio wave is reflected.

17. The radar device according to claim 16, wherein the threshold value is calculated on a basis of the reception intensity of the radio wave reflected at a second position around the first position.

18. The radar device according to claim 1, further comprising:

a noise detection circuitry configured to remove noise from the point cloud data, wherein the transform circuitry outputs the point cloud data from which the noise was removed in the second output data format.

19. The radar device according to claim 18, wherein the noise detection circuitry is configured to perform a constant false alarm rate (CFAR) process.

20. A data output method for a radar device comprising:

receiving, by reception circuitry, a reception signal from a reception antenna, sampling the reception signal for predetermined periods to provide a sampled signal, and subjecting the sampled signal to analog-to-digital (A/D) conversion for outputting data in a first output data format that includes raw data of the reception signal, wherein the data in the first output data format is provided to an output configured for access by an external processing device, and is independently accessible for use by the external processing device without requiring generation of point cloud data;

receiving, by transform circuitry, the data in the first output data format from the reception circuitry, generating point cloud data from the raw data, and outputting, by the transform circuitry, data in a second output data format; and receiving the output of the transform circuitry in the second output data, performing object recognition on the point cloud data, and outputting data in a third output data format based upon the object recognition performed on the point cloud data.

* * * * *